US012718270B2

(12) United States Patent
Fu et al.

(10) Patent No.: US 12,718,270 B2
(45) Date of Patent: Aug. 25, 2026

(54) AUTOMATED WORKFLOWS FOR PUBLISHING DIGITAL CONTENT CAMPAIGNS

(71) Applicant: PLACEMENTS, INC., Seattle, WA (US)

(72) Inventors: Edwin Fu, New York City, NY (US); Jesse Low, Seattle, WA (US); Evan Bowen, Seattle, WA (US)

(73) Assignee: Placements, Inc., New York, NY (US)

(*) Notice: Subject to any disclaimer, the term of this patent is extended or adjusted under 35 U.S.C. 154(b) by 7 days.

(21) Appl. No.: 18/373,597

(22) Filed: Sep. 27, 2023

(65) Prior Publication Data

US 2024/0020731 A1 Jan. 18, 2024

Related U.S. Application Data

(63) Continuation of application No. 17/224,948, filed on Apr. 7, 2021, now Pat. No. 11,816,702.

(Continued)

(51) Int. Cl.
*G06Q 30/00* (2023.01)
*G06F 9/54* (2006.01)

(Continued)

(52) U.S. Cl.
CPC ......... *G06Q 30/0269* (2013.01); *G06F 9/547* (2013.01); *H04L 63/0876* (2013.01); *G06Q 30/02* (2013.01); *G06Q 30/0273* (2013.01)

(58) Field of Classification Search
None
See application file for complete search history.

(56) References Cited

U.S. PATENT DOCUMENTS 7,630,480 B2 12/2009 Fleck
9,489,382 B2 11/2016 Roy et al.

(Continued)

FOREIGN PATENT DOCUMENTS

EP 4 133 442 2/2023
SG 11202308367 U 9/2024

(Continued)

OTHER PUBLICATIONS

Gopal, Ram, Xinxin Li, and Ramesh Sankaranarayanan. "Online keyword based advertising: Impact of ad impressions on own-channel and cross-channel click-through rates." Decision Support Systems 52.1 (2011): 1-8. (Year: 2011).*

(Continued)

*Primary Examiner* — Michael Bekerman
(74) *Attorney, Agent, or Firm* — Polsinelli LLP

(57) ABSTRACT

Integrated systems and method for integrated management of advertising campaigns are provided. The system provides a user device with access to a centralized transaction platform server based on authentication information provided by the user device, which is verified by one or more integrated third party systems utilized by the one or more users. The system receives data regarding inventory from the one or more integrated third party systems, wherein the data is received via an application programming interface (API). The system aggregates a collection of available inventory based on the data regarding the inventory from the one or more integrated third party system. The system filters the aggregated collection of available inventory based on one or more categories of the inventory. The system generates, on a graphical user interface, a custom display based on a received criteria that matches the one or more categories of the inventory.

21 Claims, 18 Drawing Sheets

Related U.S. Application Data

(60) Provisional application No. 63/006,572, filed on Apr. 7, 2020.

(51) Int. Cl.

| | |
|---|---|
| ***G06Q 30/0251*** | (2023.01) |
| ***H04L 9/40*** | (2022.01) |
| *G06Q 30/02* | (2023.01) |
| *G06Q 30/0273* | (2023.01) |

(56) References Cited

U.S. PATENT DOCUMENTS

| | | | | |
|---|---|---|---|---|
| 10,248,973 | B1 * | 4/2019 | Buller | G06Q 30/0275 |
| 10,402,064 | B1 * | 9/2019 | Al-Sallami | G06F 40/143 |
| 11,157,954 | B1 | 10/2021 | Belanger et al. | |
| 11,816,702 | B2 | 11/2023 | Fu et al. | |
| 2005/0165902 | A1 | 7/2005 | Hellenthal et al. | |
| 2005/0174986 | A1 | 8/2005 | Emond et al. | |
| 2007/0214045 | A1 | 9/2007 | Subramanian et al. | |
| 2008/0195475 | A1 | 8/2008 | Lambert et al. | |
| 2008/0275753 | A1 | 11/2008 | Protheroe et al. | |
| 2009/0119172 | A1 | 5/2009 | Soloff | |
| 2010/0273610 | A1 | 10/2010 | Johnson | |
| 2011/0040611 | A1 | 2/2011 | Simmons et al. | |
| 2011/0040612 | A1 | 2/2011 | Simmons et al. | |
| 2011/0040613 | A1 | 2/2011 | Simmons et al. | |
| 2011/0106593 | A1 | 5/2011 | Schoenberg | |
| 2011/0106622 | A1 | 5/2011 | Kuhlman et al. | |
| 2012/0102489 | A1 | 4/2012 | Staiman et al. | |
| 2012/0158485 | A1 | 6/2012 | Ogawa | |
| 2012/0239440 | A1 | 9/2012 | Miller et al. | |
| 2014/0074568 | A1 | 3/2014 | Moscoe et al. | |
| 2014/0114819 | A1 * | 4/2014 | Olsen | G06Q 40/12 705/30 |
| 2014/0149230 | A1 | 5/2014 | Shepard et al. | |
| 2014/0257935 | A1 | 9/2014 | Killoh et al. | |
| 2014/0279056 | A1 * | 9/2014 | Sullivan | G06Q 30/0275 705/14.71 |
| 2015/0019311 | A1 * | 1/2015 | Lee | G06Q 30/0214 705/14.16 |
| 2015/0051968 | A1 | 2/2015 | Sotelo et al. | |
| 2015/0302470 | A1 | 10/2015 | Dru et al. | |
| 2016/0078507 | A1 | 3/2016 | Shivaswamy et al. | |
| 2017/0228793 | A1 | 8/2017 | Bienstock et al. | |
| 2017/0255971 | A1 * | 9/2017 | Box | G06Q 30/0273 |
| 2017/0300856 | A1 | 10/2017 | Wilkinson et al. | |
| 2018/0096417 | A1 | 4/2018 | Cook et al. | |
| 2018/0108066 | A1 | 4/2018 | Kale et al. | |
| 2019/0012663 | A1 | 1/2019 | Masters | |
| 2019/0139170 | A1 | 5/2019 | Subramanian et al. | |
| 2019/0306214 | A1 * | 10/2019 | Drapeau | G06F 16/639 |
| 2019/0340656 | A1 | 11/2019 | Orlandic | |
| 2020/0202392 | A1 | 6/2020 | Klockner | |
| 2020/0211053 | A1 | 7/2020 | Shishkin et al. | |
| 2020/0211060 | A1 | 7/2020 | Shishkin et al. | |
| 2021/0312503 | A1 | 10/2021 | Fu et al. | |
| 2024/0013260 | A1 | 1/2024 | Fu et al. | |
| 2024/0046312 | A1 | 2/2024 | Fu et al. | |

FOREIGN PATENT DOCUMENTS

| | | | | |
|---|---|---|---|---|
| SG | 10202402723 U | | 10/2024 | |
| SG | 10202402724 S | | 10/2024 | |
| SG | 10202402725 | | 10/2024 | |
| WO | WO-2014146116 A2 | * | 9/2014 | G06Q 30/0275 |
| WO | WO-2015134835 A1 | * | 9/2015 | G06F 16/178 |
| WO | WO 2021/207410 | | 10/2021 | |

OTHER PUBLICATIONS

U.S. Appl. No. 18/374,883, Office Action dated Dec. 18, 2024.

EP Application No. 21785052.8, Extended European Search Report dated Dec. 14, 2023.

21785052.8, Edwin Fu, Integrated System Architecture and Methods Managing Programmatic Direct Digital Advertising Campaigns, Sep. 20, 2022.

11202308367U, Edwin Fu, Integrated System Architecture and Methods Managing Programmatic Direct Digital Advertising Campaigns, Nov. 3, 2023.

Frith, Robert; "What Does the Term 'White Label' Actually Mean? ", May 23, 2016, LinkedIn (Year: 2016).

White Labeling Android Apps: Getting Started, Internet archive Way Back Machine Capture date of Dec. 12, 2019, from URL https://www.raywenderlich.com/5175277-white-labeling-android-apps-getting-started (Year: 2019).

PCT Application No. PCT/US2021/026254 International Preliminary Report on Patentability dated Oct. 6, 2022.

PCT Application No. PCT/US2021/026254 International Search Report and Written Opinion dated Jun. 29, 2021.

U.S. Appl. No. 17/224,948 Final Office Action mailed Oct. 6, 2022.

U.S. Appl. No. 17/224,948 Office Action mailed Mar. 7, 2022.

U.S. Appl. No. 18/372,950, Final Office Action dated Aug. 25, 2025.

U.S. Appl. No. 18/374,883, Non-Final Office Action dated Sep. 5, 2025.

Webngage, Creating Transaction Push Campaigns (Year: 2019).

U.S. Appl. No. 18/372,950, Office Action dated Apr. 8, 2025.

U.S. Appl. No. 18/374,883, Final Office Action dated May 20, 2025.

U.S. Appl. No. 18/374,883, Final Office Action dated Feb. 5, 2026.

U.S. Appl. No. 18/372,950, Office Action dated Feb. 23, 2026.

* cited by examiner

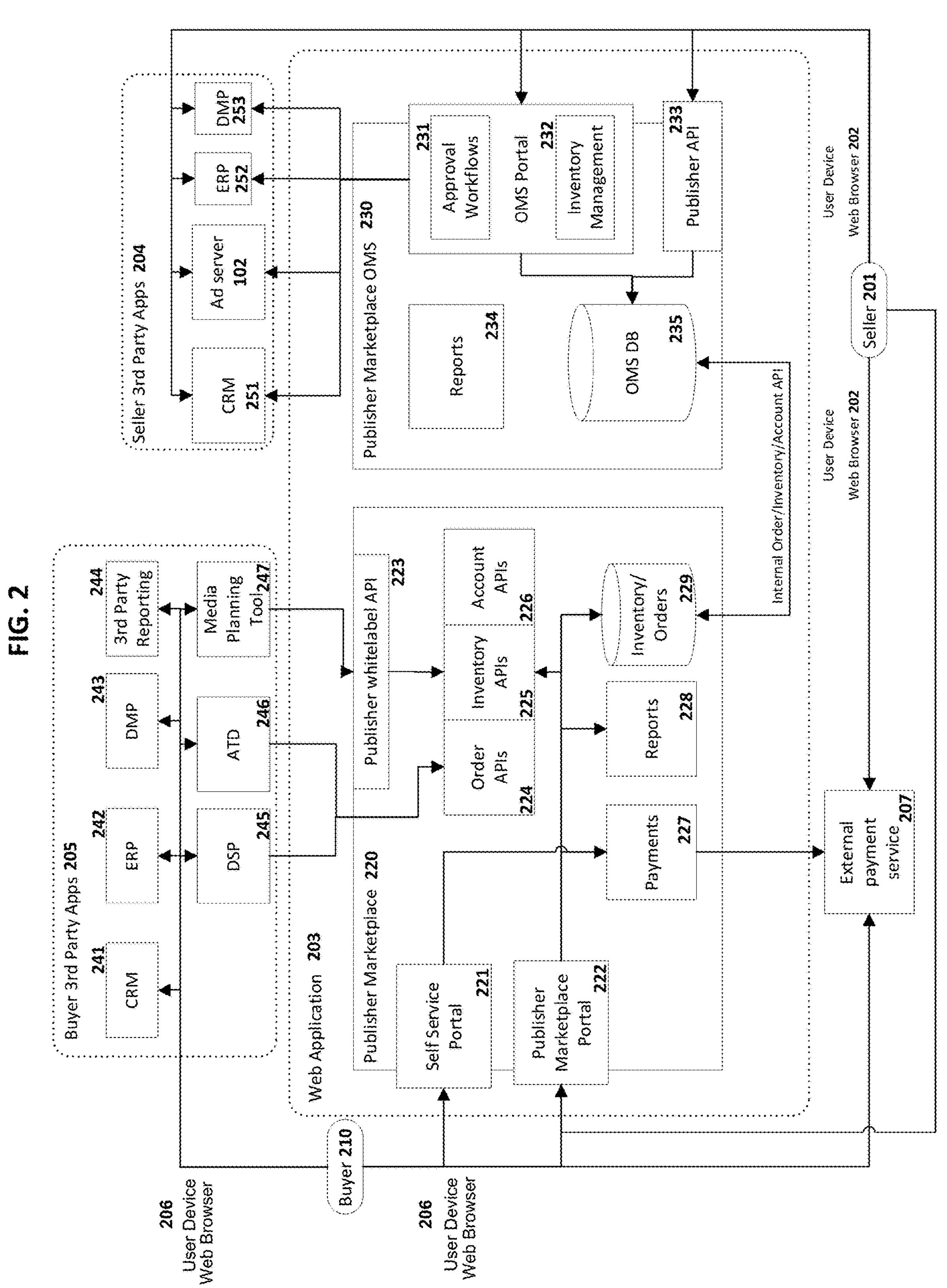
FIG. 2
Buyer 3rd Party Apps 205
CRM 241
ERP 242
DMP 243
3rd Party Reporting 244
DSP 245
ATD 246
Media Planning Tool 247
Seller 3rd Party Apps 204
CRM 251
Ad server 102
ERP 252
DMP 253
Web Application 203
Publisher Marketplace 220
Self Service Portal 221
Publisher Marketplace Portal 222
Publisher whitelabel API 223
Order APIs 224
Inventory APIs 225
Account APIs 226
Payments 227
Reports 228
Inventory/ Orders 229
Publisher Marketplace OMS 230
Approval Workflows 231
OMS Portal 232
Inventory Management
Publisher API 233
Reports 234
OMS DB 235
Internal Order/Inventory/Account API
User Device Web Browser 202
Seller 201
External payment service 207
Buyer 210
206 User Device Web Browser

Figure 9A:
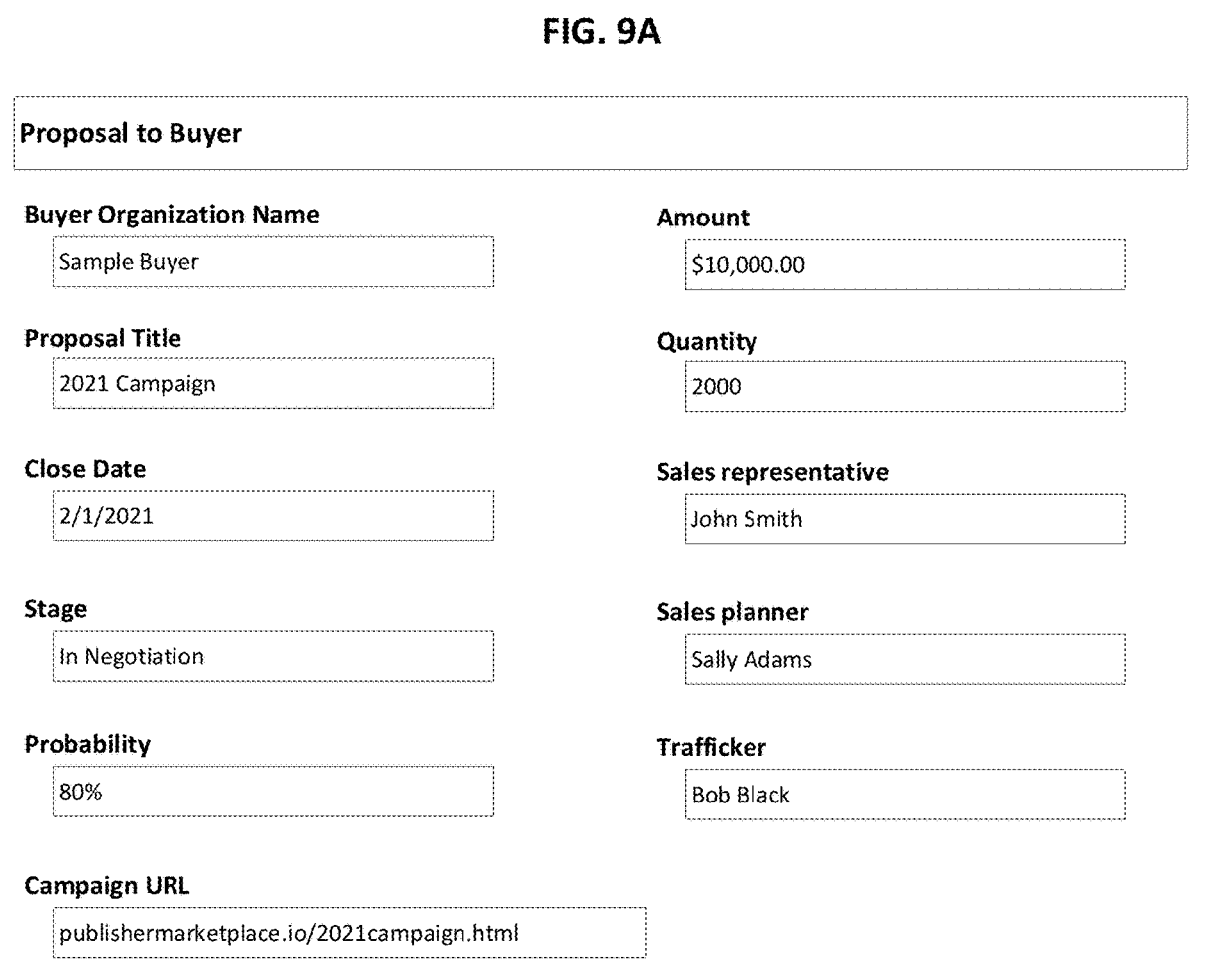

Proposal to Buyer

Buyer Organization Name
Sample Buyer

Proposal Title
2021 Campaign

Close Date
2/1/2021

Stage
In Negotiation

Probability
80%

Campaign URL
publishermarketplace.io/2021campaign.html

Amount
$10,000.00

Quantity
2000

Sales representative
John Smith

Sales planner
Sally Adams

Trafficker
Bob Black

FIG. 9B

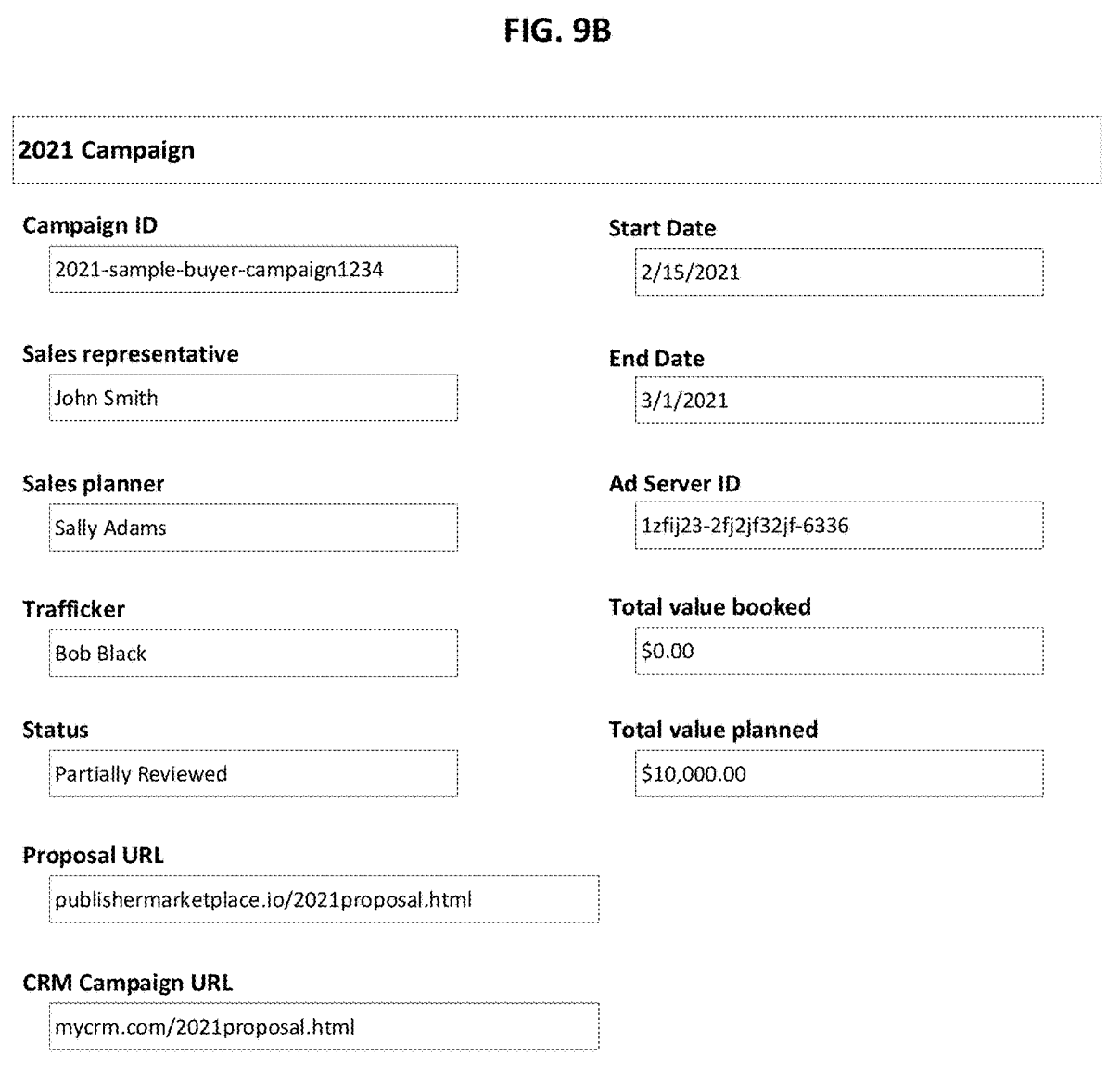

2021 Campaign

Campaign ID
2021-sample-buyer-campaign1234

Sales representative
John Smith

Sales planner
Sally Adams

Trafficker
Bob Black

Status
Partially Reviewed

Proposal URL
publishermarketplace.io/2021proposal.html

CRM Campaign URL
mycrm.com/2021proposal.html

Start Date
2/15/2021

End Date
3/1/2021

Ad Server ID
1zfij23-2fj2jf32jf-6336

Total value booked
$0.00

Total value planned
$10,000.00

FIG. 9C

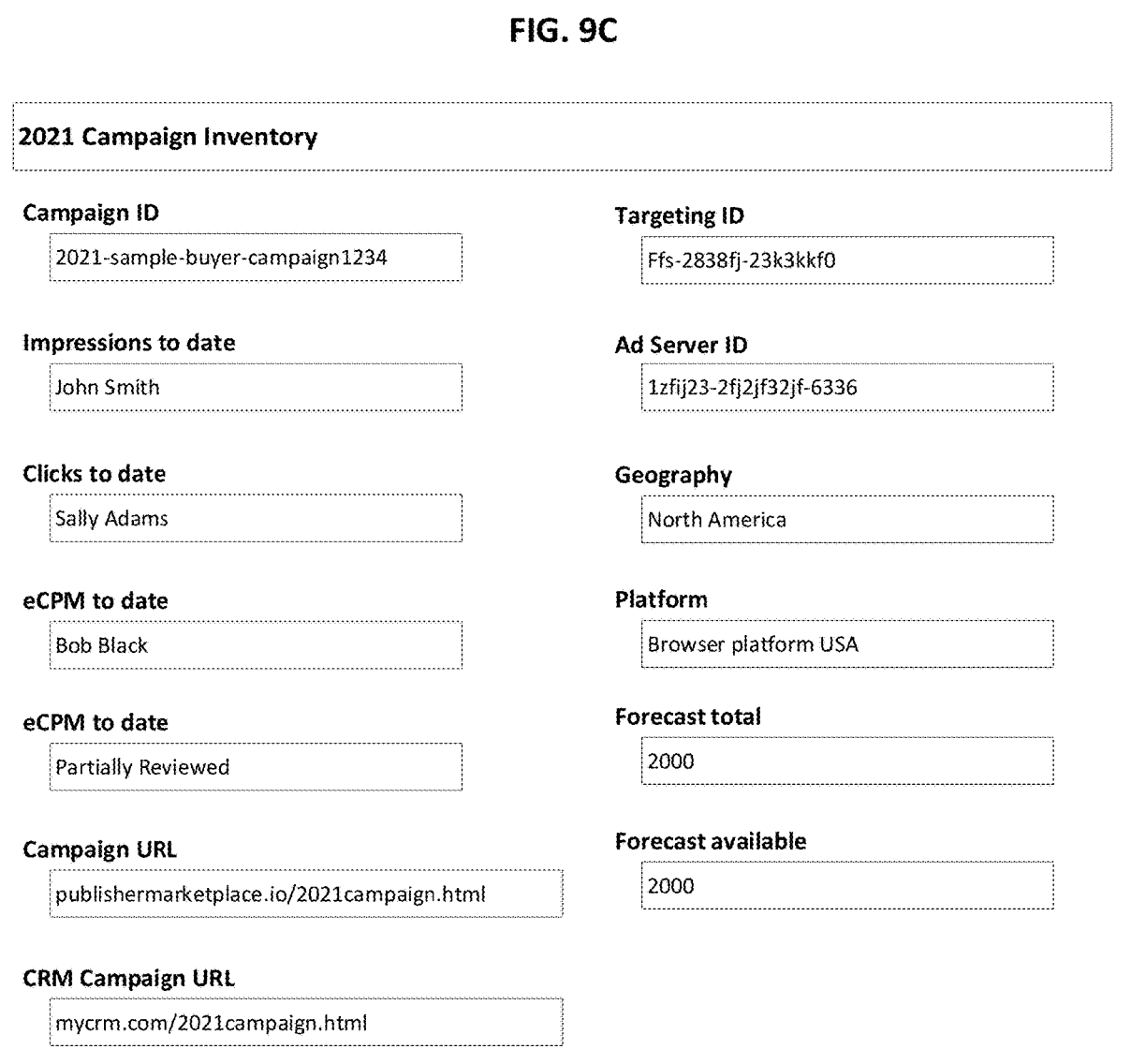

2021 Campaign Inventory

Campaign ID
2021-sample-buyer-campaign1234

Impressions to date
John Smith

Clicks to date
Sally Adams eCPM to date
Bob Black eCPM to date
Partially Reviewed Campaign URL
publishermarketplace.io/2021campaign.html CRM Campaign URL
mycrm.com/2021campaign.html Targeting ID
Ffs-2838fj-23k3kkf0

Ad Server ID
1zfij23-2fj2jf32jf-6336

Geography
North America

Platform
Browser platform USA

Forecast total
2000

Forecast available
2000

Advertiser: WWWWoooooo Buyer: Nooooooo Type: Programmatic Guaranteed $10,000 Budget | 1,000,000 Est. impressions | $10.00 Average rate Details Line Items Activity Comments Attachments Forecast

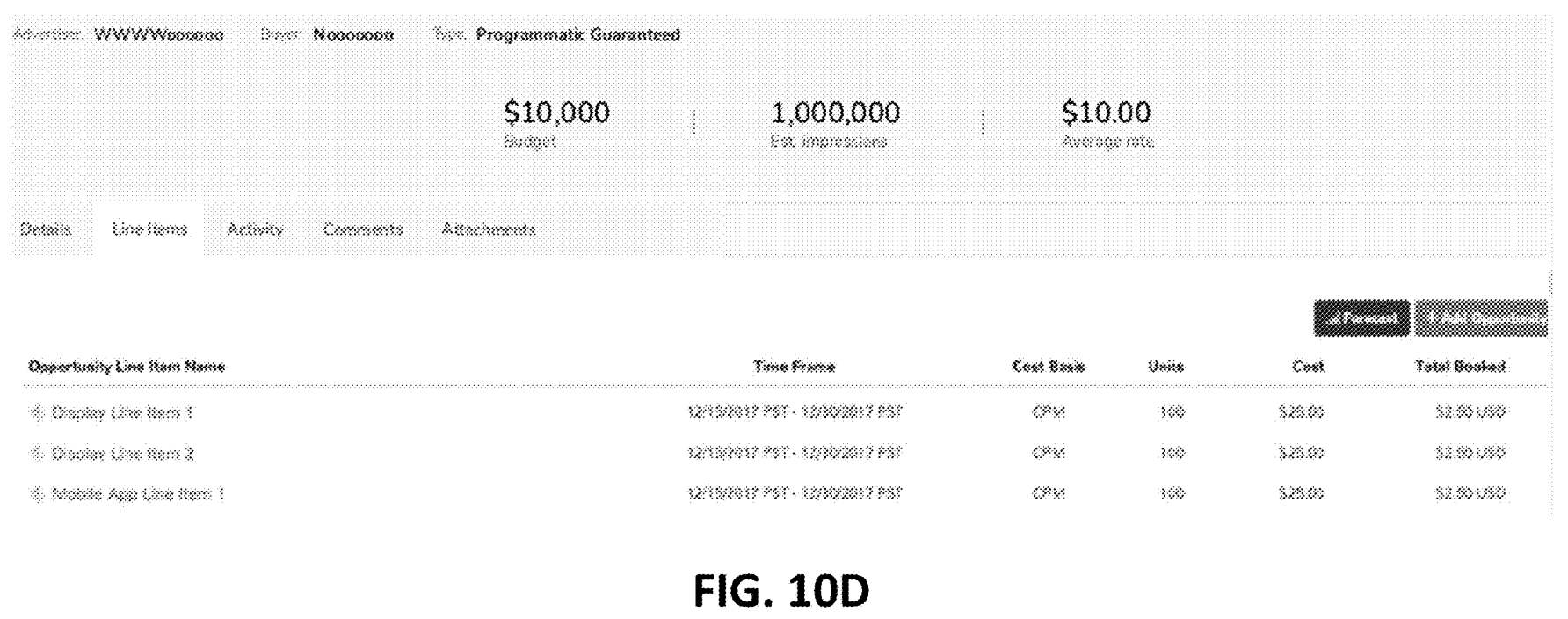

| Opportunity Line Item Name | Time Frame | Cost Basis | Units | Cost | Total Booked |
|---|---|---|---|---|---|
| Display Line Item 1 | 12/13/2017 PST - 12/30/2017 PST | CPM | 100 | $25.00 | $2.50 USD |
| Display Line Item 2 | 12/13/2017 PST - 12/30/2017 PST | CPM | 100 | $25.00 | $2.50 USD |
| Mobile App Line Item 1 | 12/13/2017 PST - 12/30/2017 PST | CPM | 100 | $25.00 | $2.50 USD |

FIG. 10D

AUTOMATED WORKFLOWS FOR PUBLISHING DIGITAL CONTENT CAMPAIGNS

CROSS-REFERENCE TO RELATED APPLICATIONS

The present patent application is a continuation and claims the priority benefit of U.S. patent application Ser. No. 17/224,948 filed Apr. 7, 2021, which claims the priority benefit of U.S. provisional application 63/006,572 filed Apr. 7, 2020, the disclosures of which are incorporated herein by reference.

BACKGROUND OF THE INVENTION

Field of the Invention

The present invention relates to the field of digital advertising. More specifically, the present invention relates to implementing and managing programmatic direct digital advertising campaigns.

Description of the Related Art

Publishers or operators of a content platform may offer and sell inventory within their respective media channels for the display of advertisements rendered to the publisher's users for the purpose of generating revenue. Such media channels include but are not limited to digital, display, mobile, video, Connected TV (CTV), Over-the top (OTT), linear, and print. Inventory may be inclusive of the impressions that publishers have made available for advertisers to purchase through their respective media channels. Impressions may be associated with advertisement units, which are the digital or physical spaces on the media channel reserved for displaying advertisements. Publishers or their representatives may be referred to as sellers herein, and the advertisers, agencies, and DSP's (defined below) who purchase the inventory may also be referred to as buyers.

Direct or traditional transactions refer to traditional reservation process in which buyers and sellers of advertising enter into a direct negotiation, whereby the buyers purchase an agreed-upon volume of impressions or ad views on an online setting (e.g., a webpage) for an agreed-upon price directly from the seller; and the seller may then manually set up the delivery of these impressions. Premium inventory is generally associated with the traditional reservation process, because such advertising units can be viewed easily by the user of the media channel. Alternatively, premium inventory may be understood as referring to spaces that experience heavy user traffic. While premium inventory may be limited, premium inventory may provide higher exposure to users and thus may be more valuable than other inventory (e.g. remnant inventory). As a result, premium inventory has generally been sold earlier and at higher prices to buyers through direct sales in comparison to remnant inventory.

Programmatic transactions have generally been used to place remnant inventory—which is associated with less visible, lower traffic advertisements units that are less valuable to advertisers— in auction-style processes. In programmatic transactions, technology is used to automate the selling and delivery process of advertising campaigns such that the buyer may never communicate directly with the seller. As premium inventory is often sold through direct sales, however, users of such programmatic channels may generally be presented with little other than remnant inventory through these programmatic channels. Because the amount of remnant inventory that is available is typically much greater than that of premium inventory, a major portion of the remnant inventory often remains unsold.

Alternatively, some publishers utilize intermediary parties that assist in selling of the remnant inventory, which may be costly, inefficient, error-prone, and time consuming. These parties may charge for their proprietary services or technologies ("tech tax") and collect as much as 40-80% of sales, thereby increasing the cost of purchasing inventory. Generally, numerous intermediary parties are utilized in a real-time bidding process, who each have a role to play in the programmatic supply chain from buyer to seller. Such involvement may lead to inefficiencies such as duplication of efforts, lost information, potential for errors (e.g., during insertion order setups), incomplete or otherwise faulty handovers, lack of transparency in sales, long wait times, and fragmented decision making. Such factors may further be associated with increase in the risk of fraud, as well as present obstacles in detecting and rectifying the same. Long wait times may further increase the risk that a buyer's plans or seller's inventory availability changes between the initiation of a deal and its completion, which leads to further rework.

Currently, third party audience data related to impressions on ad inventory are utilized across ad networks and leveraged to target and plan ad campaigns. However, regulations governing privacy, antitrust, and information security associated with different countries and regions may limit or ban various uses of third party audience data for targeting. In some countries or regions, therefore, the use of behavioral targeting using third party audience data (e.g., individual browsing profile data) may be restricted, thereby limiting the capability and efficacy of ad targeting by prior systems.

Therefore, there is a need for improved systems and methods for implementing and managing centralized programmatic digital advertising that minimizes the operational waste, increases transparency, streamlines transactions for both buyers and sellers in programmatic transactions, and improve targeting while complying with applicable regulations.

SUMMARY OF THE CLAIMED INVENTION

A first claimed embodiment of the present invention concerns a method for integrated management of digital advertising campaigns. The method includes providing a user device with access to a centralized transaction platform server based on authentication information provided by the user device, which is verified by one or more integrated third party systems utilized by the one or more users. The method also includes receiving data regarding inventory from the one or more integrated third party systems, wherein the data is received via an application programming interface (API). The method also includes aggregating a collection of available inventory based on the data regarding the inventory from the one or more integrated third party system. The method also includes filtering the aggregated collection of available inventory based on one or more categories of the inventory. The method also includes generating, on a graphical user interface, a custom display based on a received criteria that matches the one or more categories of the inventory.

A second claimed embodiment of the present invention concerns a system for integrated management of advertising campaigns are provided. The system includes a memory that stores instructions and a processor coupled to the memory.

Execution of instructions stored in the memory by the processor performs system operations. The system operations include providing a user device with access to a centralized transaction platform server based on authentication information provided by the user device, which is verified by one or more integrated third party systems utilized by the one or more users. The system operations also include receiving data regarding inventory from the one or more integrated third party systems, wherein the data is received via an application programming interface (API). The system operations also include aggregating a collection of available inventory based on the data regarding the inventory from the one or more integrated third party system. The system operations also include filtering the aggregated collection of available inventory based on one or more categories of the inventory. The system operations also include generating, on a graphical user interface, a custom display based on a received criteria that matches the one or more categories of the inventory.

A third claimed embodiment of the present invention concerns a non-transitory computer-readable storage medium, having embodied thereon a program executable by a processor to perform a method for integrated management of advertising campaigns. The executable method includes providing a user device with access to a centralized transaction platform server based on authentication information provided by the user device, which is verified by one or more integrated third party systems utilized by the one or more users. The executable method also includes receiving data regarding inventory from the one or more integrated third party systems, wherein the data is received via an application programming interface (API). The executable method also includes aggregating a collection of available inventory based on the data regarding the inventory from the one or more integrated third party system. The executable method also includes filtering the aggregated collection of available inventory based on one or more categories of the inventory. The executable method also includes generating, on a graphical user interface, a custom display based on a received criteria that matches the one or more categories of the inventory.

BRIEF DESCRIPTION OF THE DRAWINGS

FIG. 2 illustrates an exemplary network architecture in which an integrated programmatic digital placement system may be implemented.

FIG. 5 is a block diagram illustrating an exemplary placement interaction in an online publisher marketplace.

FIG. 9A is a diagram of an exemplary graphical user interface (GUI) display associated with a digital placement proposal.

FIG. 9B is a diagram of an exemplary graphical user interface (GUI) display associated with a digital placement campaign.

FIG. 9C is a diagram of an exemplary graphical user interface (GUI) display associated with digital campaign inventory.

FIGS. 10A-E are screenshots illustrating alternative graphic user interface (GUI) displays associated with use of an integrated programmatic digital placement system.

DETAILED DESCRIPTION

An integrated system and methods for facilitating and managing programmatic direct advertising campaigns is disclosed. The systems disclosed herein improves upon current systems by centralizing the critical components needed to manage and execute campaigns in digital advertising. The system utilizes a web-based application that assists buyers and sellers of digital advertising in the exchange of information to reserve placement of advertising space in online and other digital settings, such as on a webpage. The web-based application allows direct communication between the buyers and sellers to list and purchase premium inventory via programmatic technology and facilitates sale of remnant inventory by improving visibility of the remnant inventory. Thus, the present system provides a direct link between inventory creation and demand, which bypasses intermediary agencies and current ad networks. Further, the inventory from various sellers are aggregated and packaged based on different types of inventory to be purchased by buyers through the web-based application. Lastly, the web-based application allows sellers and buyers to manage orders, inventory, and fulfillments. Sellers may create and send proposals, which lists the inventory for sale for a specific deal terms, send the proposals to buyers, and allow buyers to review and accept the proposals.

Figure 1:
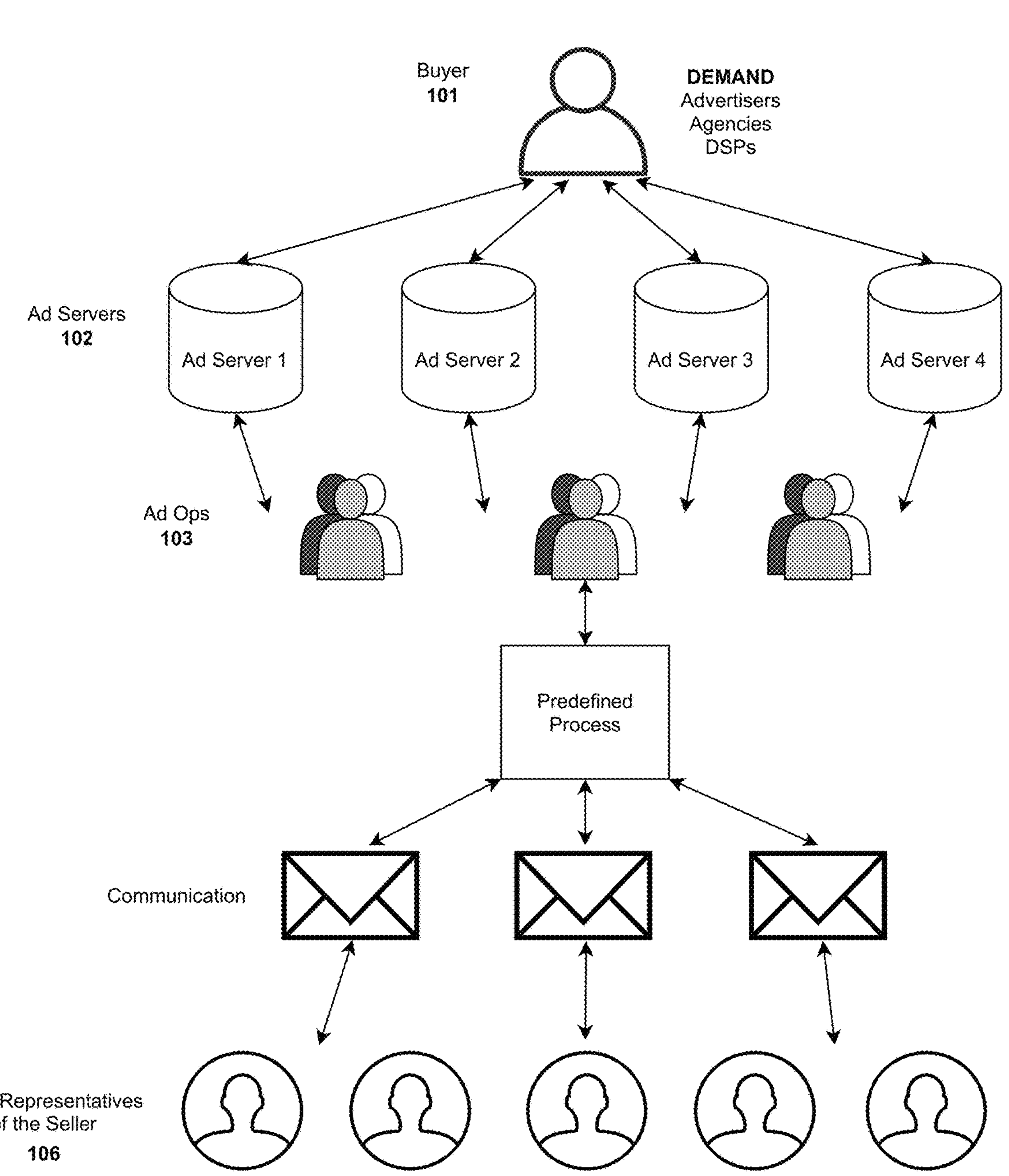
FIG. 1 illustrates an exemplary prior art programmatic transaction process.

FIG. 1 illustrates an exemplary prior art programmatic transaction process. Programmatic direct may also be referred to as "automated guaranteed" or "programmatic guaranteed" within the advertising industry. In programmatic direct sales, the buyer and seller agree on a certain volume of impression much like direct sales, but leverage programmatic technology to replace certain aspects of a direct sales advertising campaign. Programmatic direct allows buyers to have access to premium, guaranteed inventory, which guarantees certain number of impressions or views. From a seller's perspective, premium inventory is often sold at an optimal price with a transparent buyer. Programmatic direct methods utilize technology to transmit proposals to other party of transaction for review.

In the programmatic direct process illustrated in FIG. 1, a buyer 210 may be an advertiser, brand, or an agency. The buyer 101 may utilize a demand-side platform (DSP), which provides direct access for real-time bidding to multiple sources of inventory of the seller. A DSP may be operated by agencies or advertisers.

The buyer 101 of FIG. 1 sends the ad request to one or more advertising servers (ad server) 102 with the intent of purchasing premium inventory. Ad servers 102 represent one or more advertising servers that provide a myriad of features to provide ad-management solutions that help the sellers sell, schedule, deliver, or measure their digital ad inventory, and optimize their revenue. A seller may be a publisher or an agency. Ad ops 103, personnel who manage the advertising operations of the seller, view the ad request in the ad server 102 to run a predefined process where the request is evaluated before being passed to sales representatives 106 of the seller. The sales representative 106 may also be a sales planner of the seller. The predefined process may include the ad ops 103 communicating the offer to the sales representatives 106, the sales representatives 106 negotiating the fees for the request, or sending the negotiated fee to the ad ops 103 who insert the counteroffer back into the ad server 102 for the confirmation of the buyer. This process can repeat several times before a deal is reached. Thus, although programmatic direct methods provide benefits over the traditional transactions by utilizing technology, prior programmatic direct systems exhaust excess resources in communication and personnel.

Moreover, the current programmatic systems do not search various ad servers of different sellers, provide targeting of inventory to send proposals that fit the need of each parties, facilitate management of multiple proposals or campaigns, or provide ways to integrate with the current workflows of the user.

FIG. 2 illustrates an exemplary network architecture in which an integrated programmatic digital placement system may be implemented. The integrated system overcomes the deficiencies and limitation of prior programmatic direct systems and methods, at least in part by, providing buyers and sellers (otherwise referred to as "users") a greater level of efficiency to manage and execute their programmatic direct campaigns. The integrated system provides users with a single access point to (i) manage and execute programmatic guaranteed transactions, (ii) utilize a centralized order management system, (iii) leverage seamless integration with a user's third party providers, which can be viewed and managed from the invention's web application (such as billing, reporting functionalities, and data reconciliation from third party providers), and (iv) use an intuitive user interface for managing and executing programmatic direct campaigns. Thus, integrated programmatic direct methods utilize technology to deliver greater advertising campaign effectiveness through advanced targeting via audience lists, enable users to target and optimize across campaigns, provide better frequency management across spending types, and provide better tracking of campaigns across a wide range of metrics. The sellers or buyers can use such programmatic technologies to optimize for multiple campaigns, and manage frequency across programmatic and guaranteed reservation inventory. Integrated programmatic direct methods also improve workflow efficiency, reduce human error and save time and money through centralized trading. Further, adopting an integrated programmatic system significantly reduces overhead for finance teams by consolidating billing. Instead of handling multiple invoices for each direct contract and performing month-end reconciliations, users are able to obtain payment through one invoice. Moreover, the integrated programmatic direct methods allow integration with current custom workflows of a user by specifying custom business rules.

A seller 201 may be a publisher, an agency, or personnel of the publisher or the agency, that has ad inventory available on an ad server 102. The seller 201 may use a user device 202, such as a personal computer or similar device connected to the internet and used to access a web URL to log into a web user interface of a software-as-a-service (SaaS) application 203 for managing advertising campaigns. The buyer 210 may similarly use a user device 206 to access the application. The seller 201 or the buyer 210 may provide authentication and authorization information, such as email and password, to access the application 203. Once seller 201 or buyer 210 has logged into the application 203, seller 201 or buyer 210 may be directed to a home page of the application 203 for viewing and accessing various tools for managing advertising campaigns and accessing the publisher marketplace.

The application 203 allows seller 201 to display the available inventory of the seller 201 for sale to buyer 210 along with all required information on the publisher marketplace order management system (OMS) 230. Buyer 210 may be able to view inventory of participating sellers directly within the web application 203 before providing an offer in the publisher marketplace 220. The publisher marketplace 220 optimizes the decision making of the buyer 210, and optimizes inventory allocation and revenue for seller 201. Buyer 210 may review and purchase advertising inventory of seller 201 directly on the publisher marketplace through the web application 203, and seller 201 may be able to send proposals to buyers directly for purchase. Both parties can agree on the deal terms within the application 203 before fulfilling the transaction. A buyer may view campaign metrics in reports 228 within the publisher marketplace 220. The seller may use predefined approval workflows 231 within the OMS to automate order creation of buyer proposals into the OMS database (DB) 235. The seller may utilize inventory management within the OMS portal 232 as orders created in the OMS portal 232 are synced backed to ad server 102 of the seller 201 in real-time. This means that the seller may view real-time available inventory on the publisher marketplace OMS 230 without accessing ad server 102. The seller may also use direct connection to publisher API 233 to insert orders directly into the OMS DB 235. The seller may view reports 234 related to on-going closed or canceled orders within the OMS 230. The advantage of receiving reports 234 in a centralized OMS 230 allows the seller to view various information regarding remaining inventory and broker deals related to the remaining inventory in one interface.

Seller 201 may create a product in the publisher marketplace to list available inventory. Products may contain attributes of available inventory including type of product to indicate whether the product is a standard product or a packaged product, cost basis, cost per unit, and the ad server 102 where the inventory is available for allocation. Seller 201 may add targeting attributes to a product within the web application 203 including demographic, geography, day of the week and time available, environment type such as browser or video player, and custom keys such as device availability. Seller 201 may manage the price of a product within the publisher marketplace by configuring business rules. The business rule may increase the price of the product as more targeting attributes are added to the product. The business rules may also require further approval if the value of the product increases above the floor value. Thus, the business rules allow for dynamic pricing based on the targeting attributes in conjunction with approval rules. Additional costs may be applied as custom rules to individual products for inventory, such as a product that may include a data fee per unit, or ad serving fees as a percentage of the total inventory cost purchased. The application 203 may suggest a recommended price based on targeting attributes associated with a product. Seller 201 may apply tiered rates to products that provide volume discounts at different thresholds of inventory quantity exchanged. Seller 201 may package inventory with appropriate targeting attributes as a single product, such as ad inventory available for video and browser display that target the same demographic or geography. Packaged products enable seller 201 to maximize inventory visibility and revenue, and provide buyer 210 with additional campaign fulfillment options within a sole product listing.

The application 203 aggregates available inventory 229 from various ad servers connected to the publisher marketplace 220 via inventory application programming interface (API) 225 and displays aggregate available inventory uniformly in the web application UI to buyer 210. The buyer 210 may access the publisher marketplace 220 via self-service portal 221 or via publisher marketplace portal 222. A unified product schema enforces normalization of inventory data on the publisher marketplace as available inventory are matched to targeting attributes defined by the publisher marketplace when a product is listed. Normalization of product attributes allow inventory from various integrated ad servers to display in a centralized catalog. Buyer 210 may search aggregated available inventory by defining one or more filters relating to inherent attributes of inventory including but not limited to inventory type, ad server 102 where the inventory is available, cost basis, cost per unit, geography, and demographic.

The application 203 may allow seller 201 to manage orders via publisher marketplace order management system (OMS) 230. The OMS 230 may display inventory from various ad servers as catalog of products. The OMS 230 provides the seller 201 with a process to create proposals through an intuitive user interface that captures the appropriate fields, sends a proposal directly to buyer 210, and allows the buyer 210 to review and accept the proposal from the seller 201 directly from the application 203. The OMS 230 allows the users to easily view the deal terms, such as inventory quantity and type, billing schedule, and payment. Seller 201 may use the order management system to check the status of a proposal pending buyer 210 review, request verification and acceptance of the proposal, and reserve inventory on ad server 102 that buyer 210 has agreed upon before a campaign is ready to occupy the allocated inventory. The OMS 230 allows proposals that are accepted to become orders in the order management system of the application 203. Seller 201 may initiate an agreed upon order within the application 203 for fulfillment to ad server 102, pause fulfillment on a live order campaign or resume fulfillment on a paused order campaign, or renegotiate a previous order for additional fulfillment. Orders in the OMS 230 allow buyer 210 and seller 201 to track a range of live metrics, such as click through rates or conversions. The application 203 may be connected to ad server 102 of seller 201 via API to fulfill sales orders directly from the web application 203 by sending a request from the application 203 to ad server 102 to allocate the inventory that buyer 210 purchased to be displayed on various client devices. This capability further demonstrates a greater level of efficiency for seller 201 and buyer 210 to manage and execute their programmatic direct campaigns than prior programmatic direct systems and methods by providing seller 201 and buyer 210 the ability to access one single access point for this purpose. Because the application 203 is connected directly to ad server 102, the integrated programmatic direct method encourage transparency in fulfilment of deal terms obtained from ad server 102, reducing fraudulent transactions.

The application 203 allows the user to configure business rules, including but not limited to, approval workflows 231 for the purpose of setting parameters in advertising campaigns to maintain integrity of pricing and/or purchasing inventory. Associated approval rules can be set to designated approvers.

A billing manager tool 227 of the publisher marketplace 220 allows seller 201 or buyer 210 to streamline the invoice responsibility in the application 203. Seller 201 or buyer 210 can determine billable units and billable revenue at the line item level for each client, generate custom billing reports in conjunction with the integrated invoice system, and generate invoices directly into the application 203 and communicate to clients or other counterparties. Seller 201 or buyer 210 may issue invoices, pay or receive payment on open invoices, and reconcile month end statements within the application 203 without the use of an additional third party system. Alternatively, the seller and the buyers may utilize a third party system for payment, such as an external payment service 207.

An interaction engine of the application 203 facilitates communication between seller 201 and buyer 210 as well as provides communication channels within sub-sections or departments of their own organization. Thus, the application 203 promotes cross functional interaction and collaboration within the organization and reduces the likelihood of organization silos, which was a major cause in operational waste in prior systems. The interactive engine of the application 203 may reduce the distribution of tasks between different functions of the organization of seller 201 or buyer 210 as different members of the seller 201 or buyer 210 can communicate and collaborate with each other within the web application 203, which increases efficiency. For example, buyer 210 and seller 201 may communicate regarding the deal terms, such as impressions, price, demographics, or campaign schedule, which may be further viewed in the order management system.

Seller 201 may utilize applicable data that has been transferred to and from third party applications 204 of sellers 201 and data from third party applications 205 of buyer 210 via bi-directional application programming interface (API) of the application 203. Similarly, buyer 210 may utilize applicable data that has been transferred to and from third party applications 205 of buyer 210 and data transferred from third party applications 204 of seller 201 via bi-directional API of the application 203.

The web application 203 uses API's to provide the interoperability between third party systems on the internet. The web application 203 leverages different types of APIs such as REST and SOAP, for seller 201 or buyer 210 to manage their orders programmatically. Each third party system has a dual sync into the web application 203 under such API so that critical information is ingested into the web application 203 for seller 201 and buyer 210 to leverage and user inputs within the web application 203 sync back to the applicable third party system. For clarification, the APIs allow for a dual sync in data between third party systems and the web application 203. As such seller 201 and buyer 210 can utilize and manage critical third party systems without having to access each third party system separately.

The application 203 may integrate with numerous third party systems, such as third party applications 204 and 205, using an email address of the seller 201 or buyer 210, which allows the web application 203 to automatically map such accounts associated with the seller 201 or buyer 210 across the external systems to which seller 201 or buyer 210 is subscribed to. Inputs provided by seller 201 or buyer 210 may be stored in a main application database. The web application 203 may use the information provided by seller 201 or buyer 210 to communicate with the external integration to fulfill the action of the seller 201 or buyer 210. The application 203 integrates with applicable third party applications 204 and 205 to bi-directionally sync data to allow a user to evaluate inventory yield and attractiveness of such inventory directly from the application 203.

Seller 201 and buyer 210 may enter information in designated fields by either typing the information or choosing dropdown options that are available when the user is synced to their integrated third party system. Data is entered into the web application 203 and pushed into the integrated external third party systems depending on the required campaign activity.

Third party applications 204 on the seller 201 side and buyer 210 side may include customer relationship management (CRM) system 251, ad server 102, data management platform (DMP) 253, enterprise resource planning (ERP) 252, any third party reporting services, or any custom built, internal applications utilized by seller or buyer. The custom built application for buyer 210 may utilize a publisher white-labeled API 223 to connect to the publisher marketplace 220 to query order APIs 224, inventory APIs 225 and account APIs 226 to create an order.

The CRM 251 system may allow the buyer 210 or seller 201 to manage relationship with customer of the buyer 210 or seller 201 or counterparties while providing various functions such as advertising campaigns, enquiries, sales, technical support, billing and other functionalities unique to the user's business. The CRM 251 may track and analyze customer specific information to enable the business entity to retain the customers by providing improved services, identifying sales opportunities, executing appropriate advertising campaigns, maintaining proper relationships, etc.

Seller 201 may integrate the web application 203 with a CRM 251 via an API. The web application 203 may leverage the API for reading and writing data to applicable standard fields of the CRM 251. The integration may also be configured within the web application UI to utilize customized data fields of the CRM 251. The web application 203 may be configured to automatically sync data in real-time related to buyer 210 and active or complete campaigns in the CRM via triggers for certain fields that meet a condition on a buyer 210 order.

For example, seller 201 may create a proposal for a programmatic direct sale with buyer 210 as a proposal in the CRM 251 in addition to being able to create a proposal in order management of the web application 203. The proposal may contain standard fields, including but not limited to, deal stage and probability, as well as additional custom selected fields enabled as rules by seller 201 in the web application 203 configuration. Data such as deal stage and probability may determine when a negotiation for a proposal between seller 201 and buyer 210 has reached a milestone to be converted into an exchange of data that will utilize ad server 102 inventory. Upon the deal stage or probability meeting a selected condition, such as "closed won", the relevant proposal details from the CRM 251 may be automatically synced to the web application 203 as a campaign for buyer 210 or seller 201 to access and manage. The proposal details automatically synced to the web application 203 may include but are not limited to ad inventory type, quantity, cost per unit, start date, and end date.

Further, once a transaction representing a campaign has been automatically synced to the web application 203, planners, campaign managers, and traffickers for seller 201 may manage the fulfillment of a campaign to the ad server 102 within the web application UI. As a campaign elapses, the relevant details regarding fulfillment, delivery and billing are recorded in the web application 203 and relayed to the CRM via the API. The delivery and billing data synced between the web application 203 and seller 201 CRM may include but are not limited to impressions to date, clicks to date, clickthrough rate (CTR), effective cost per mile (eCPM), and invoicing adjustments.

Further still, data related to products or inventory utilized, such as targeting data, contracted units, first-party and third party usage can be synced from the ad server 102 via the web application 203 API to the campaign record in the CRM for the duration of the campaign.

Additional data may be automatically aggregated and synced to the CRM 251 via the API to measure real-time efficacy of a campaign. An on-schedule indicator (OSI) may represent the delivery rate of a campaign as a ratio of serviced impressions and clicks to total contracted impressions and clicks in an active order. Based on the OSI ratio, revenue at risk (ROR) can be determined to measure potential risk in non-fulfillment of a campaign. ROR may then be synced to the campaign transaction details within the CRM throughout the duration of a campaign. Upon the expiration of a scheduled campaign, revenue at loss may be determined and synced to the CRM from the web application 203 if the OSI and subsequent revenue at risk was not fulfilled. Seller 201 may utilize this data in the CRM to provide active support to buyer 210 and make any adjustments to effectively utilize a campaign and the related ad inventory, further increasing the likelihood of successful campaigns for both buyer 210 and seller 201. OSI and ROR obtained from the CRM may further be used to predict future performance and profitability.

The integration with an ad server 102 may permit seller 201 to sell the ad inventory directly to buyer 210, by confirming the number of advertisement impressions or clicks that are available to sell. Vice versa, ad server 102 allows buyer 210 to insert offers of advertisement impressions that they would like to buy.

The integration with a DMP may allow buyer 210 or seller 201 to create target audiences based on a combination of in-depth first-party and third party audience data, accurately target campaigns to these audiences across third party ad networks and exchanges, and measure with accuracy which campaigns performed the best across segments and channels to refine media buys and ad creative over time. As such, the integration with the DMP allows the collection of first-party data for targeting of ad campaigns, which improves upon the current systems that rely solely on third party audience data.

Seller 201 or buyer 210 may integrate an ERP system to the web application 203 using an API. ERP may manage invoicing, accounting, and billing needs of buyer 210 or seller 102. Integration with an ERP provides a continuously updated view of core business processes using common databases maintained by a database management system. Integration with an ERP system may track business resources—cash, raw materials, production capacity—and the status of business commitments: orders, purchase orders, and payroll. The applications that make up the system share data across various departments such as manufacturing, purchasing, sales, or accounting department, that provide the data. ERP facilitates information flow between all business functions and manages connections to outside stakeholders.

A sales order for buyer 210 may be created by web application 203 automatically via an API in an ERP 252 of seller 201 when a proposal is accepted and agreed upon. A sales order generated by the exchange of data between the buyer 210 and seller 201 on the publisher marketplace may be invoiced in the ERP based on the created sales order and paid by buyer 210. Multiple transactions between a buyer 210 and seller 201 on the publisher marketplace may be aggregated and issued as a single invoice from the seller 201 to the buyer 210, increasing efficiency in applying payment and performing billing reconciliation. Data included in an invoice may contain campaign information such as campaign ID, start date, end date, and seller representative information required for payroll and sales commission. An invoice may also include line items representing ad inventory contracted units, cost basis, cost per unit for each campaign agreed to by seller 201 and buyer 210. Additionally, any custom fields required to complete the sales order may be configured within the web application 203 and matched to fields on the sales order created in the ERP to automate the generation of the invoice.

Third party reporting services, such as YieldX of AppNexus may provide reports on metrics and effectiveness of campaign. Seller 201 or buyer 210 may view advanced reporting to evaluate performance and anticipate how much buyers might pay for future impressions. Seller 201 may view accurate inventory availability for all audiences to discover upsell opportunities, and monitor campaigns in real time to identify under-delivery issues and optimize campaigns that have the most revenue at risk.

Third party applications 205 on the buyer side may include similar third party applications 204 of seller 201, such as CRM 241, ERP 242, and DMP 243. Third party applications 205 of the buyer may further include demand side platform (DSP) 245. DSP 245 may provide buyer 210 with direct access for multiple sources of inventory. Third party applications 205 of the buyer may further include agency trading desk (ATD) 246, third party reporting systems 244, and media planning tool 247. For example, buyer may utilize ATD 246 that leverages a DSP 245 to create orders via the order APIs 224 in the publisher marketplace 220.

Figure 3:
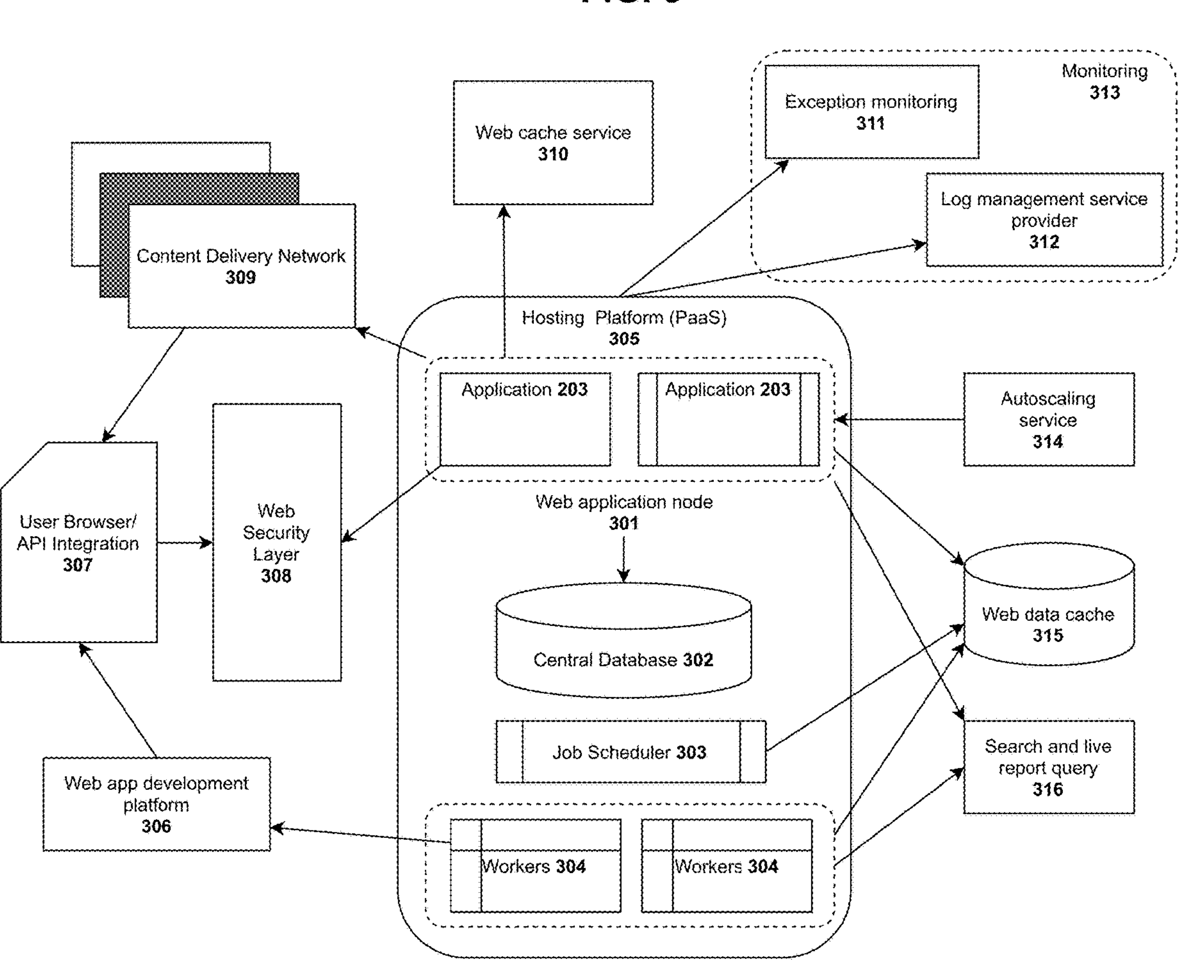
FIG. 3 is a block diagram illustrating an exemplary application for implementing methods of integrated programmatic placement of digital advertising.

FIG. 3 is a block diagram illustrating an exemplary application for implementing methods of integrated programmatic placement of digital advertising. The web application 203 communicates with a central relational database 302 via a web application 203 node 301. Data can be requested or sent to the relational database 302 by on demand requests or scheduled tasks performed by workers 304. A job scheduling system 303 for automated tasks utilizes workers 304 to perform automated recurring tasks where data is requested from or sent to the central relational database 302. Additionally, workers 304 interact with the database when a request is initiated on demand or from a cached request in the web data cache 315 from the web application 203 user interface. In various embodiments, the workers 304, relational database 302, automated task scheduler 303, and web application 203 itself, may reside within a platform as a service (PaaS) or similar functionalities that serve as a hosting provider 305. Different platform hosting arrangements and functionalities known in the art may be available for use in other implementations.

Automated and on-demand workers 304 may send development updates to a web app development platform 306 into the web applications user interface 307. The user interface 307 of the web application 203 is accessed while connected to a web security layer 308. A Content Delivery Network (CDN) 309 is integrated with the application 203 and is utilized to establish and maintain connection via proxy servers within the web browser 307 that a user is accessing the web application 203 from. A web cache service 310 may be utilized with the web application 203 to provide additional data temporary storage.

The hosting platform 305 provides access to monitoring tools 313 to measure performance of the server and application. These tools include but are not limited to exception monitoring and reporting 311, as well as a log management service provider 312.

The hosting PaaS 305 may use language autoscaling 314 to accommodate any programming language library to dynamically display the application. The application may also utilize workers 304 to run live reports and queries 316 into the central relational database 302 to provide additional reporting and analytics.

Figure 4:
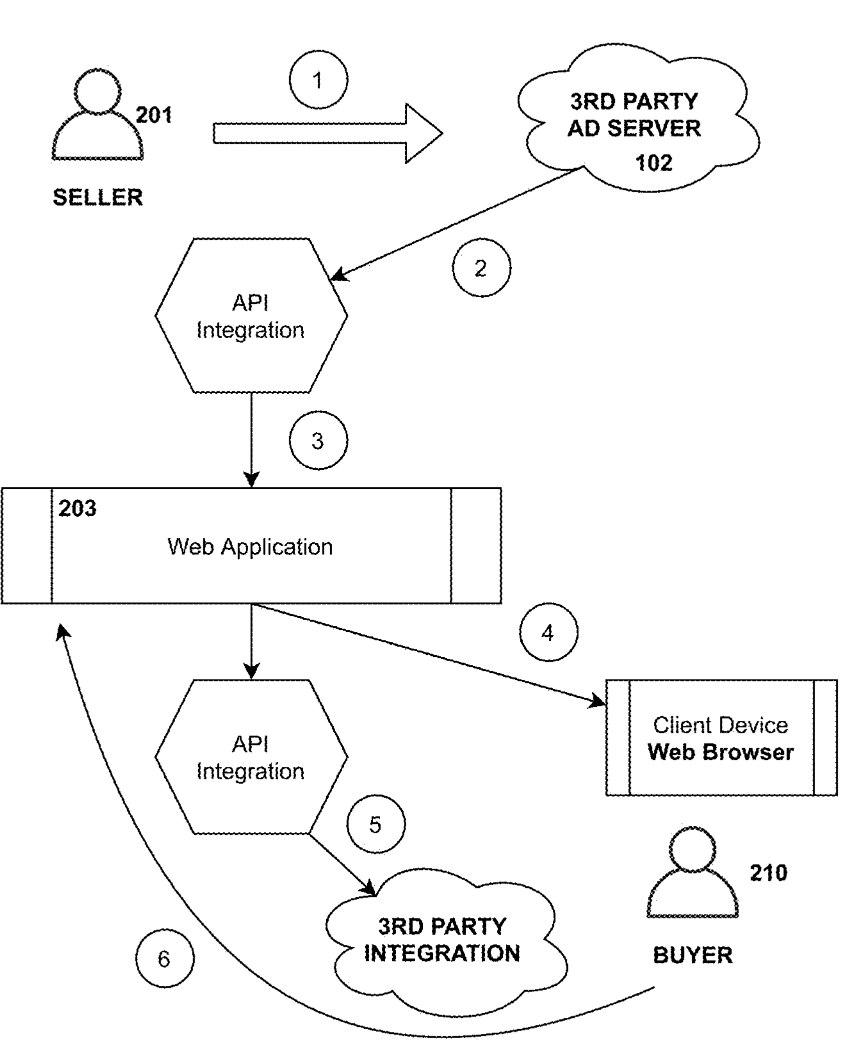
FIG. 4 is a diagram illustrating an exemplary workflow for integrated programmatic digital placement.

FIG. 4 is a diagram illustrating an exemplary workflow for integrated programmatic digital placement. In step 1, seller 201 may utilize an ad server 102, which is a third party system utilized by the seller 201, to list an available inventory. In step 2, ad server 102 may communicate with the application 203 via an API regarding the available inventory. For example, the ad server 102 and the application 203 may exchange data regarding the quantity of available inventory, price of the inventory, serviceable geography, additional demographics, and type of inventory such as display, mobile, video, programmatic guaranteed or preferred deals. In step 3, the publisher marketplace is updated with the available inventory automatically in real-time or near real-time in response to push or pull request from the application 203 via the API. The application 203 may further send the data received from the ad server 102 to a web browser of another client, such as buyer 210, utilizing the application 203. For example, in step 4, the application 203 transmits the data regarding the available inventory to a web browser of user device 206 of buyer 210 utilizing the application 203. Buyer may view the available inventory as well as the associated data regarding the inventory on the application 203. The application 203 may also communicate with a third party system of a buyer 210 to send the data regarding the available inventory via an API, as shown in step 5. The received data regarding the available inventory by the third party system of the buyer 210 may be used to execute an appropriate campaign by the buyer 210, as shown in step 6. For example, the third party system of the buyer 210, such as CRM, may receive the data regarding the available inventory and buyer 210 may utilize the received data to create a proposal on the application 203.

Figure 5:
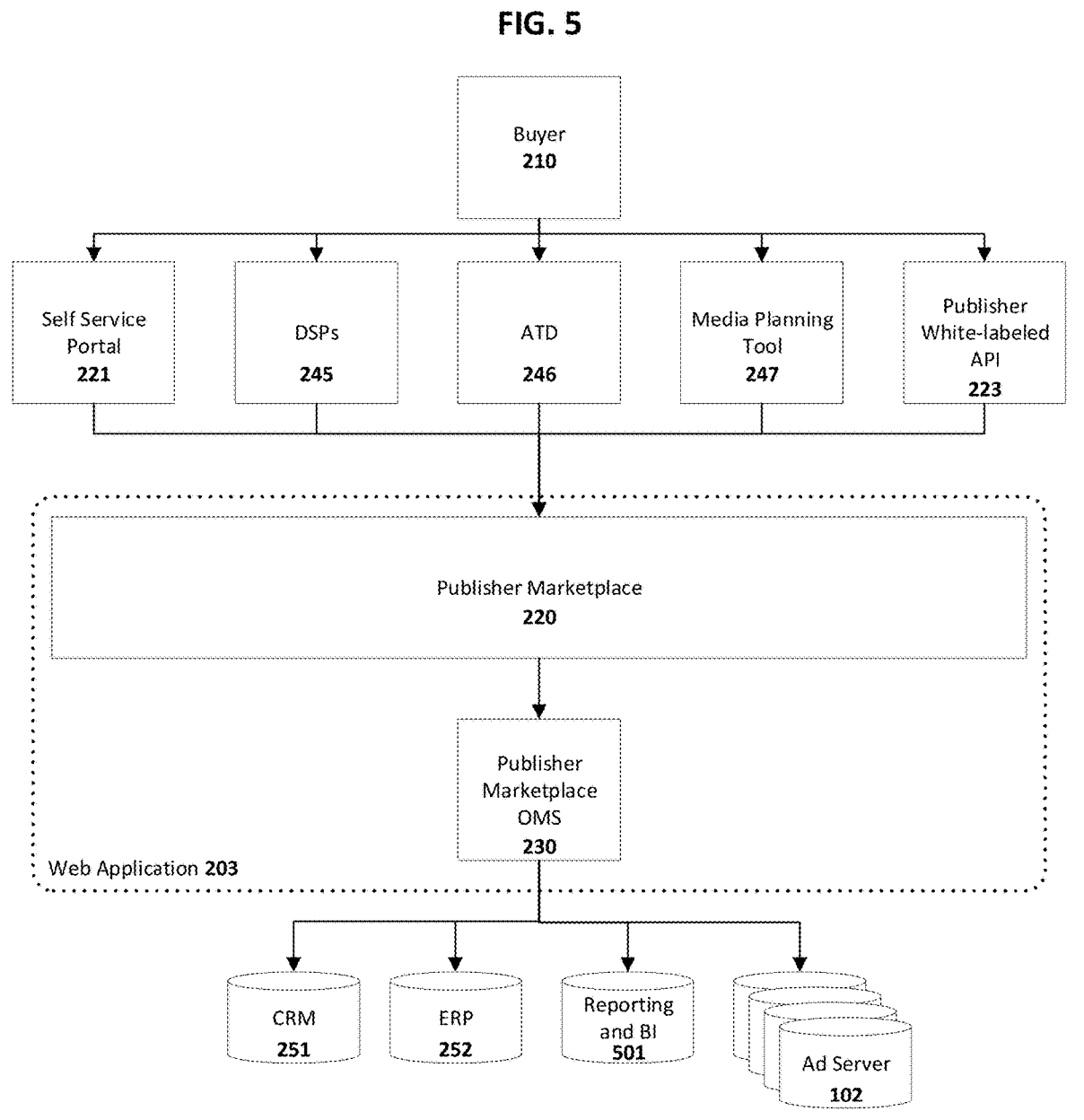

FIG. 5 is a block diagram illustrating an exemplary placement interaction in an online publisher marketplace. Specifically, the buyer 210 may interact with the publisher marketplace via various tools, such as the self-service portal 221 of the web application 203 or with third party services 205 of the buyer 210. For example, the buyer may utilize third party services, such as DSP 245, ATD 246, media planning tool 247, or a custom-built software connected via white-labeled API to seller 223, further illustrated in FIGS. 5A-5D. Various tools that connect the buyer 210 to the publisher marketplace 220 allow orders to be created in the publisher marketplace order management system 230. The order management system 230 of the publisher marketplace may further connect with third party systems 204 of the seller 201, such as CRM 251, ERP 252, reporting and business intelligence (BI) 501, and ad server 102 via API.

Figure 6A:
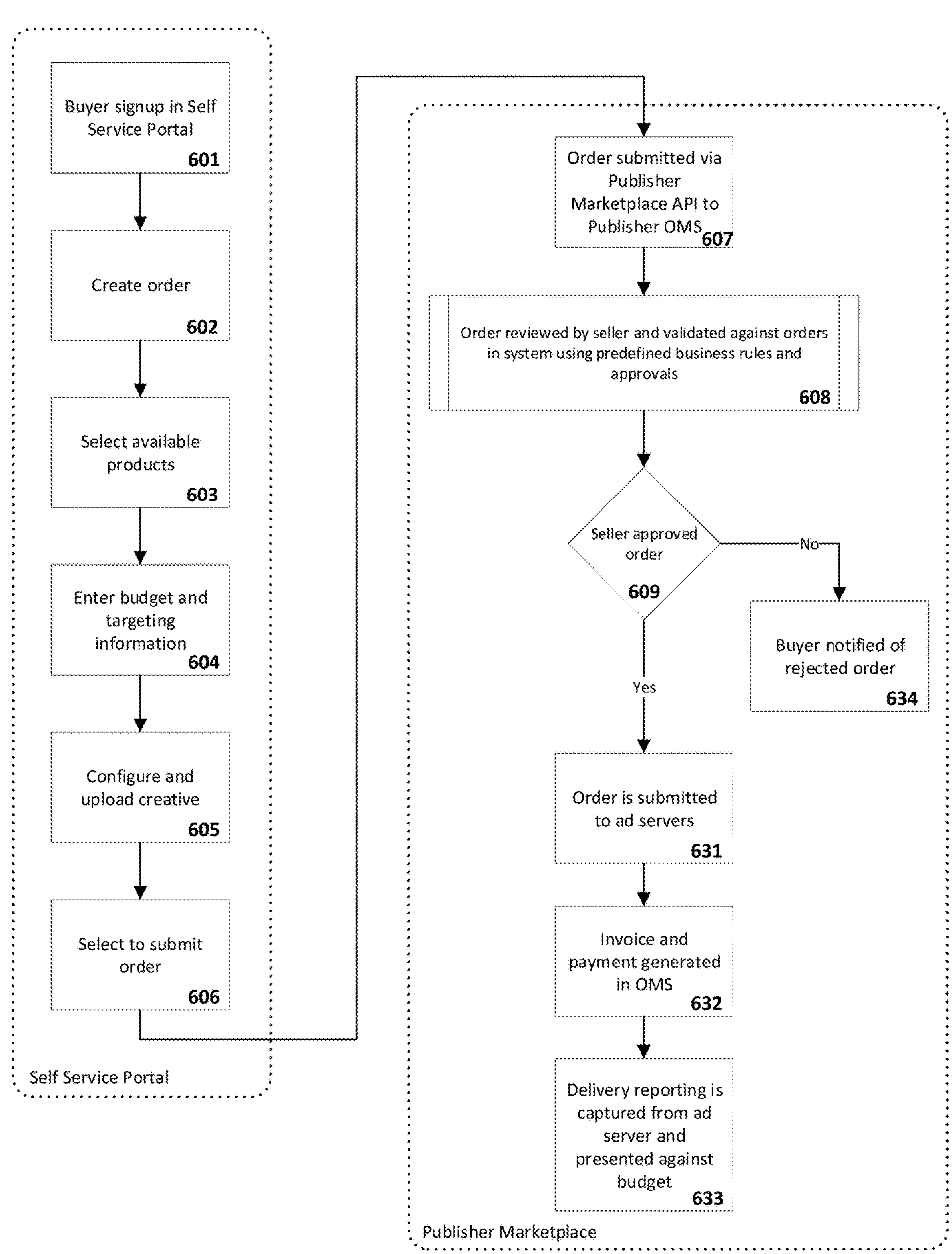
FIG. 6A is a flowchart illustrating an exemplary method for placement interaction with an online publisher marketplace via self-service portal.

FIG. 6A is a flowchart illustrating an exemplary method for placement interaction with an online publisher marketplace via self-service portal. In this example, the buyer interacts with publisher marketplace via the self-service portal of the web application to create an order. In step 601, buyer signs up in self-service portal. Buyer creates an order in the self-service portal in step 602 and selects from available products on the publisher marketplace in step 603 by searching for criteria, such as flight (start and end date of campaign), number of impressions, or the seller. In step 604, the buyer may filter the available products by entering budget and targeting information. Buyer may select budget for a specific number of impressions. Buyer may further select targeting information including first party or third party audience information according to demographics (age, gender, language, etc.), user device type, audience behavior, audience interest, or lifestyle. For example, buyer may select filters for targeting to include "first party audience," "fashion" or to exclude "sports" to target inventory associated with first party audience data that reflects audience interested in fashion. Demographics information associated with audience data may be allowed to further define a specific age group, gender, or those who are fluent in a specific language. In step 605, buyer may further upload creatives and configure attributes such as render size for the advertisements that may be included in an order. In step 606, buyer may submit an order to seller via an API to the order management system within publisher marketplace.

In step 607, the order the buyer submitted is received by the seller in the publisher marketplace order management system. In step 608, seller may review and validate an order submitted by buyer against predefined business rules and requiring approval from one or more representatives of seller. In step 609, the seller may approve or reject an order. In step 613, seller may reject an order from buyer for one or more reasons related to budget, available inventory, selected targeting criteria, etc. and notify the buyer the order has been rejected. Buyer may adjust and resubmit an order that has been rejected by seller. If the seller approved the order submitted by the buyer in step 609, order is submitted to ad servers immediately and immediately push the order inventory to ad server. Step 611, invoice and payments are generated in the order management system within the publisher marketplace of seller to send to buyer. Seller may further collect payment on an invoice in the order management system from buyer. In step 612, buyer may view reporting on the delivery of an order as captured from the inventory utilized on related ad server. Buyer may further view delivery data of an order in relation to budget planned for the order.

Figure 6B:
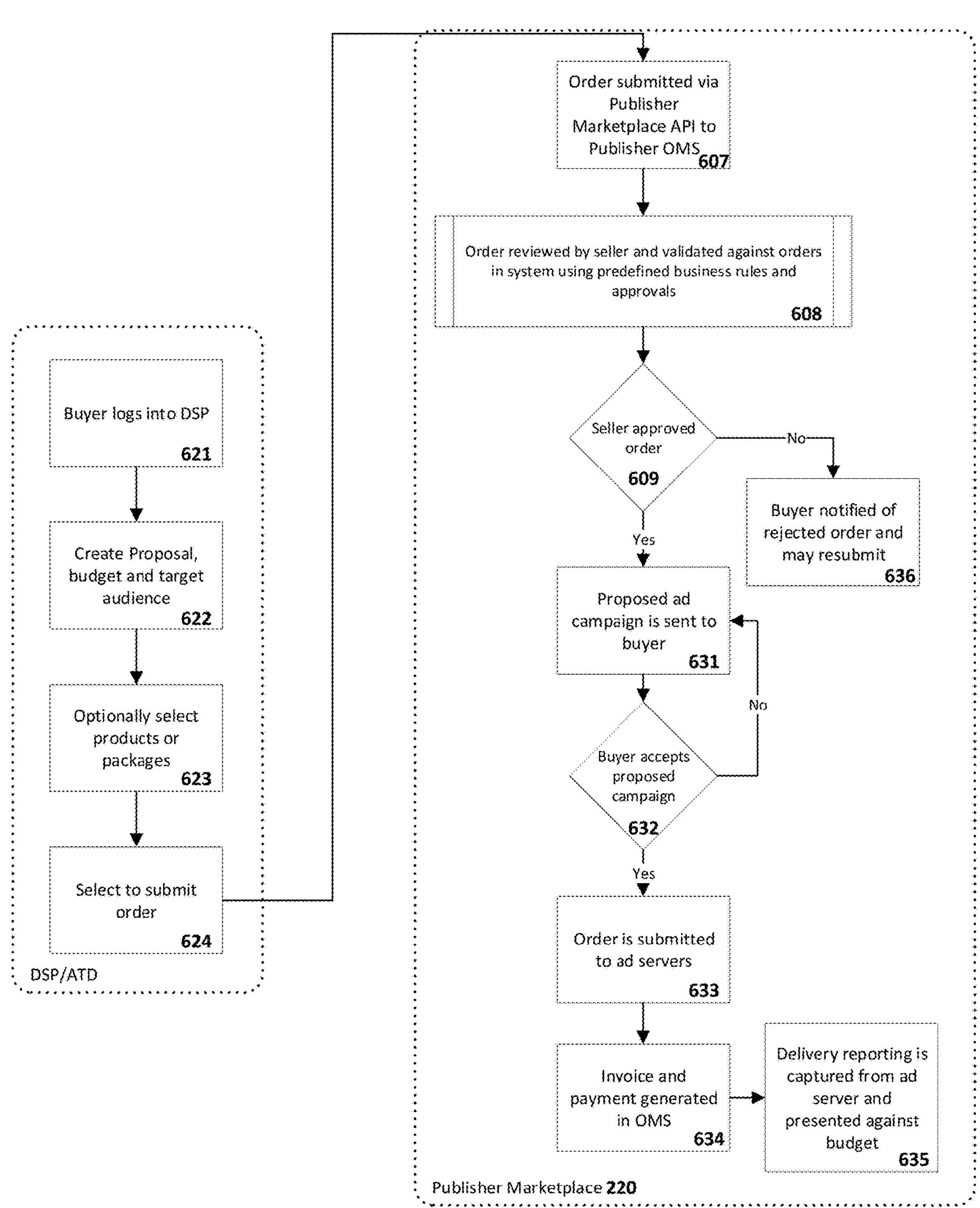
FIG. 6B is a flowchart illustrating an exemplary method for placement interaction with an online publisher marketplace via a demand-side service.

FIG. 6B is a flowchart illustrating an exemplary method for placement interaction with an online publisher marketplace via a demand-side platform service. In this example, the buyer interacts with publisher marketplace via the ATD, which may buy and resell media using DSP to assist buyers obtain specific audience. In step 621, the buyer logs into DSP. In step 622, buyer creates proposal and select targeting information similarly as described in step 604 of FIG. 6A. In step 623, buyer may optionally select products or packages to include within a proposal. In step 624, buyer may finalize a proposal by submitting the proposal as an order via an API to the publisher marketplace wherein the order is created in the seller order management system.

In step 607, the order the buyer submitted is received by the seller in the publisher marketplace order management system. In step 608, seller may review and validate an order submitted by buyer against predefined business rules and requiring approval from one or more representatives of seller. In step 609, the seller may approve or reject an order. Seller may approve an order submitted by buyer and notify buyer of approval. Seller may reject an order from buyer for one or more reasons related to budget, available inventory, selected targeting criteria, etc. In step 636, buyer is notified that the order has been rejected and buyer may adjust and resubmit an order that has been rejected by seller. If the order is approved, the proposed ad campaign is sent to the buyer in step 631. The buyer may review the approved campaign and accept or reject finalized proposal of the seller in step 632. Seller may resubmit rejected proposals to buyer for additional review. In step 633, the order is submitted to ad server when seller and buyer agree to a final proposal. In step 634, invoice and payment are generated in order management system. In step 635, delivery reporting is captured from ad server and presented against budget. Buyer may view reporting on the delivery of an order as captured from the inventory utilized on related ad server. Buyer may further view delivery data of an order in relation to budget planned for the order.

Figure 6C:
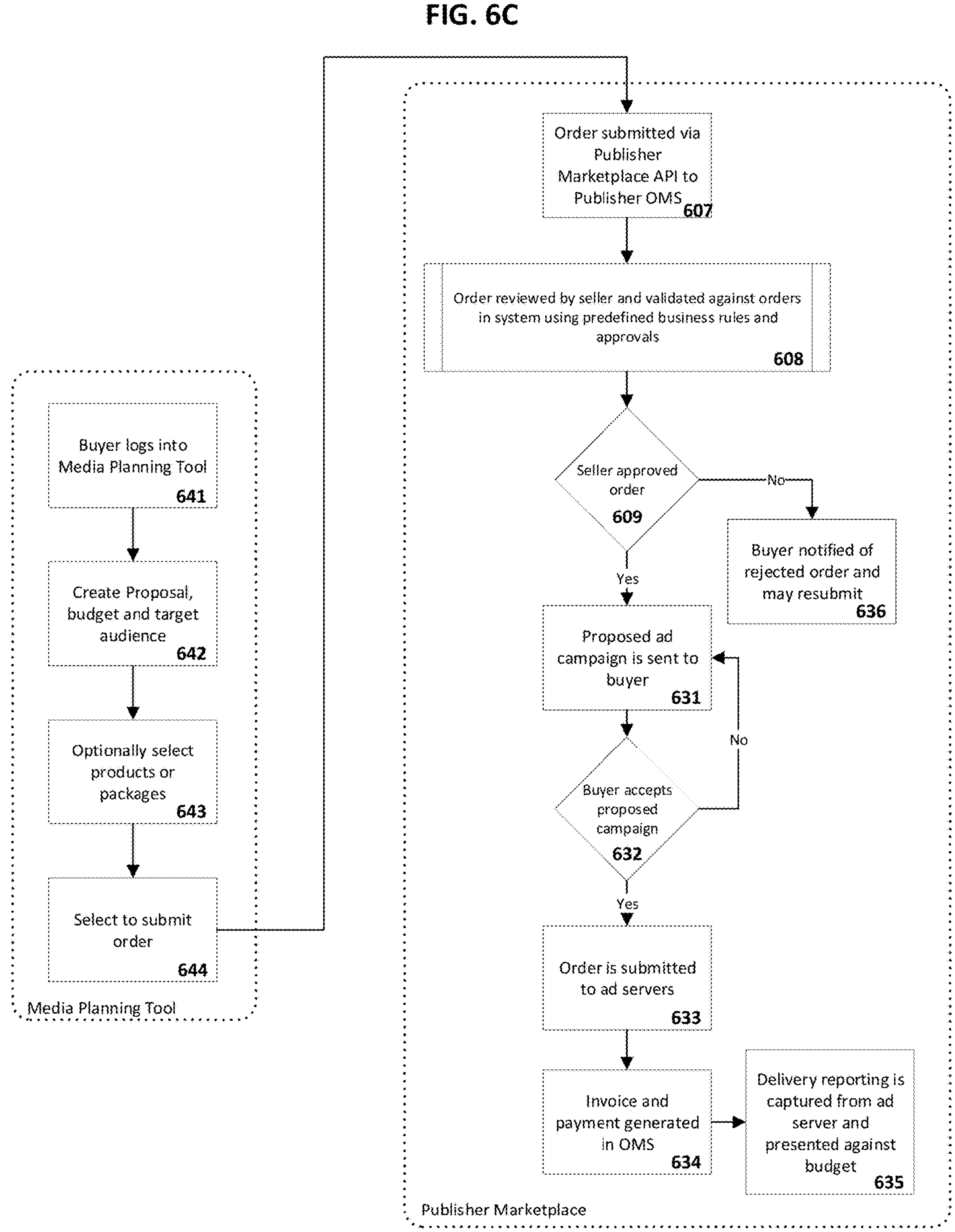
FIG. 6C is a flowchart illustrating an exemplary method for placement interaction with an online publisher marketplace via a media planning tool.

FIG. 6C is a flowchart illustrating an exemplary method for placement interaction with an online publisher marketplace via a media planning tool. In step 641, buyer logs into media planning tool. In step 642, buyer may create a proposal and select targeting information similarly as described in step 604 of FIG. 6A. In step 643, buyer may optionally select products or packages to include within a proposal. In step 644, buyer may finalize a proposal by submitting the proposal as an order via an API to the publisher marketplace wherein the order is created in the seller order management system.

In step 607, the order the buyer submitted is received by the seller in the publisher marketplace order management system. In step 608, seller may review and validate an order submitted by buyer against predefined business rules and requiring approval from one or more representatives of seller. In step 609, the seller may approve or reject an order. Seller may approve an order submitted by buyer and notify buyer of approval. Seller may reject an order from buyer for one or more reasons related to budget, available inventory, selected targeting criteria, etc. In step 636, buyer is notified that the order has been rejected and buyer may adjust and resubmit an order that has been rejected by seller. If the order is approved, the proposed ad campaign is sent to the buyer in step 631. The buyer may review the approved campaign and accept or reject finalized proposal of the seller in step 632. Seller may resubmit rejected proposals to buyer for additional review. In step 633, the order is submitted to ad server when seller and buyer agree to a final proposal. In step 634, invoice and payment are generated in order management system. In step 635, delivery reporting is captured from ad server and presented against budget. Buyer may view reporting on the delivery of an order as captured from the inventory utilized on related ad server. Buyer may further view delivery data of an order in relation to budget planned for the order.

Figure 6D:
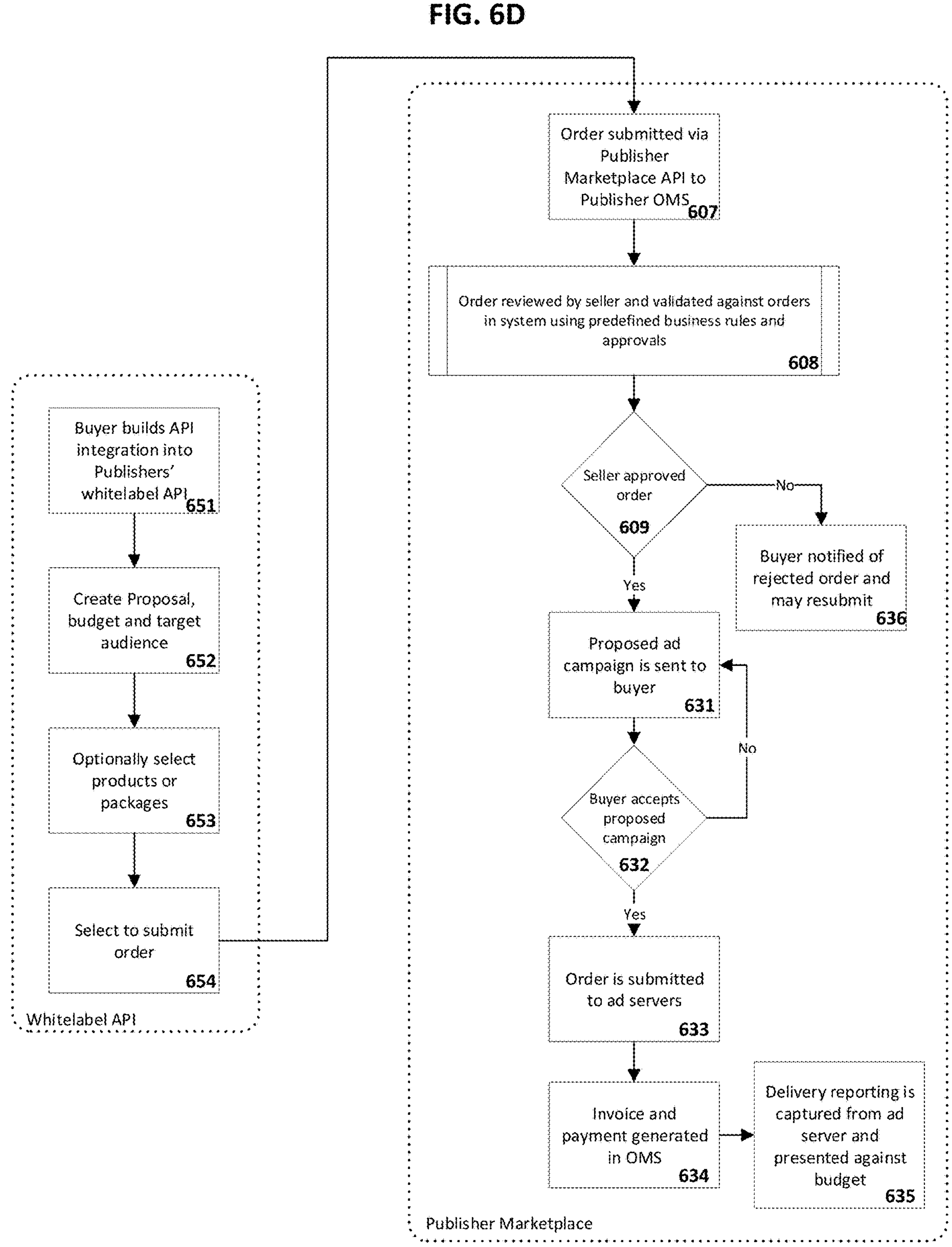
FIG. 6D is a flowchart illustrating an exemplary method for placement interaction with an online publisher marketplace via an application programming interface (API).

FIG. 6D is a flowchart illustrating an exemplary method for placement interaction with an online publisher marketplace via an application programming interface (API). In this example, the buyer interacts with publisher marketplace via a white-labeled API. A white-labeled API allows a custom-built software by buyer to connect with the seller via the publisher marketplace. A white-labeled API may be used when there is an existing relationship between buyer and seller utilizing the custom-built software of the buyer. In step 651, buyer builds API integration into seller's white-label API. In step 652, buyer may create proposal and select targeting information similarly as described in step 604 of FIG. 6A. In step 653, buyer may optionally select products or packages to include within a proposal. In step 654, buyer may finalize a proposal by submitting the proposal as an order via an API to the publisher marketplace wherein the order is created in the seller order management system.

In step 607, the order the buyer submitted is received by the seller in the publisher marketplace order management system. In step 608, seller may review and validate an order submitted by buyer against predefined business rules and requiring approval from one or more representatives of seller. In step 609, the seller may approve or reject an order. Seller may approve an order submitted by buyer and notify buyer of approval. Seller may reject an order from buyer for one or more reasons related to budget, available inventory, selected targeting criteria, etc. In step 636, buyer is notified that the order has been rejected and buyer may adjust and resubmit an order that has been rejected by seller. If the order is approved, the proposed ad campaign is sent to the buyer in step 631. The buyer may review the approved campaign and accept or reject finalized proposal of the seller in step 632. Seller may resubmit rejected proposals to buyer for additional review. In step 633, the order is submitted to ad server when seller and buyer agree to a final proposal. In step 634, invoice and payment are generated in order management system. In step 635, delivery reporting is captured from ad server and presented against budget. Buyer may view reporting on the delivery of an order as captured from the inventory utilized on related ad server. Buyer may further view delivery data of an order in relation to budget planned for the order.

Figure 7:
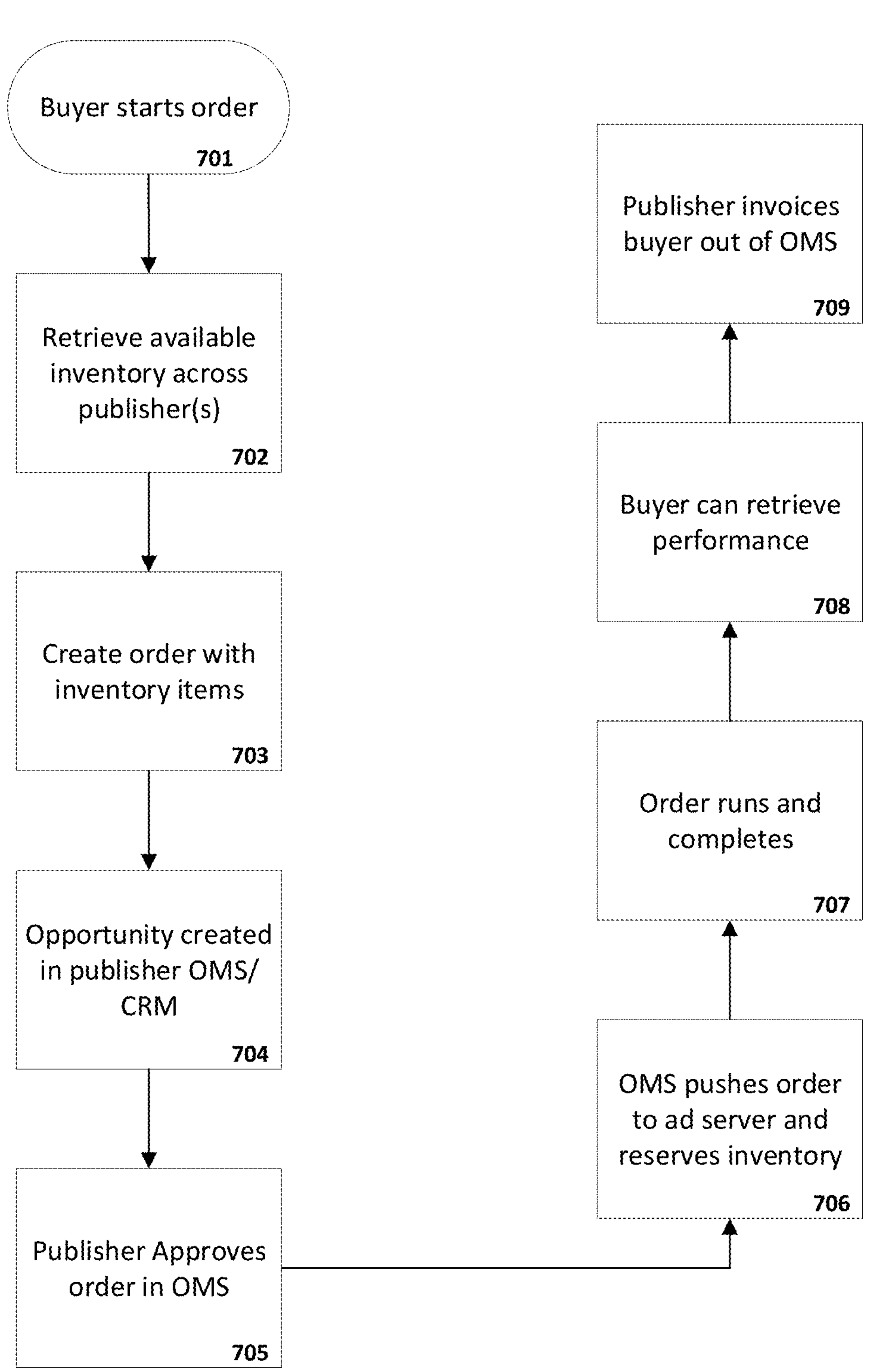
FIG. 7 is a flowchart illustrating an exemplary method for implementing programmatic placement proposals.

FIG. 7 is a flowchart illustrating an exemplary method for implementing programmatic placement proposals. Specifically, FIG. 7 illustrates an exemplary programmatic proposal process initiated by buyer. In step 701, buyer may start an order. In step 702, buyer may retrieve available inventory across from sellers. In step 703, buyer may create order with inventory items as previously described in FIGS. 6A-6D. For example, buyer may submit the proposed order to seller directly via the publisher marketplace. Alternatively, buyer may submit the proposed order from one or more third party systems via an API to the publisher marketplace as described in FIGS. 6A-6D. In step 704, a submitted order may be created in the order management system for seller to review. In step 705, seller may approve a proposed order within the order management system of the publisher marketplace. In step 706, the order management system pushes approved orders to seller ad server to reserve inventory related to the inventory items selected by buyer. In step 707, reserved inventory is utilized to fulfill and complete an ad campaign as defined by inventory items selected by buyer and agreed to by seller. In step 708, buyer can retrieve performance statistics of the fulfilled order to evaluate order success and efficacy. In step 709, seller may send an invoice for the inventory utilized to buyer via the order management system to bill and collect payment related to the fulfilled order.

Figure 8:
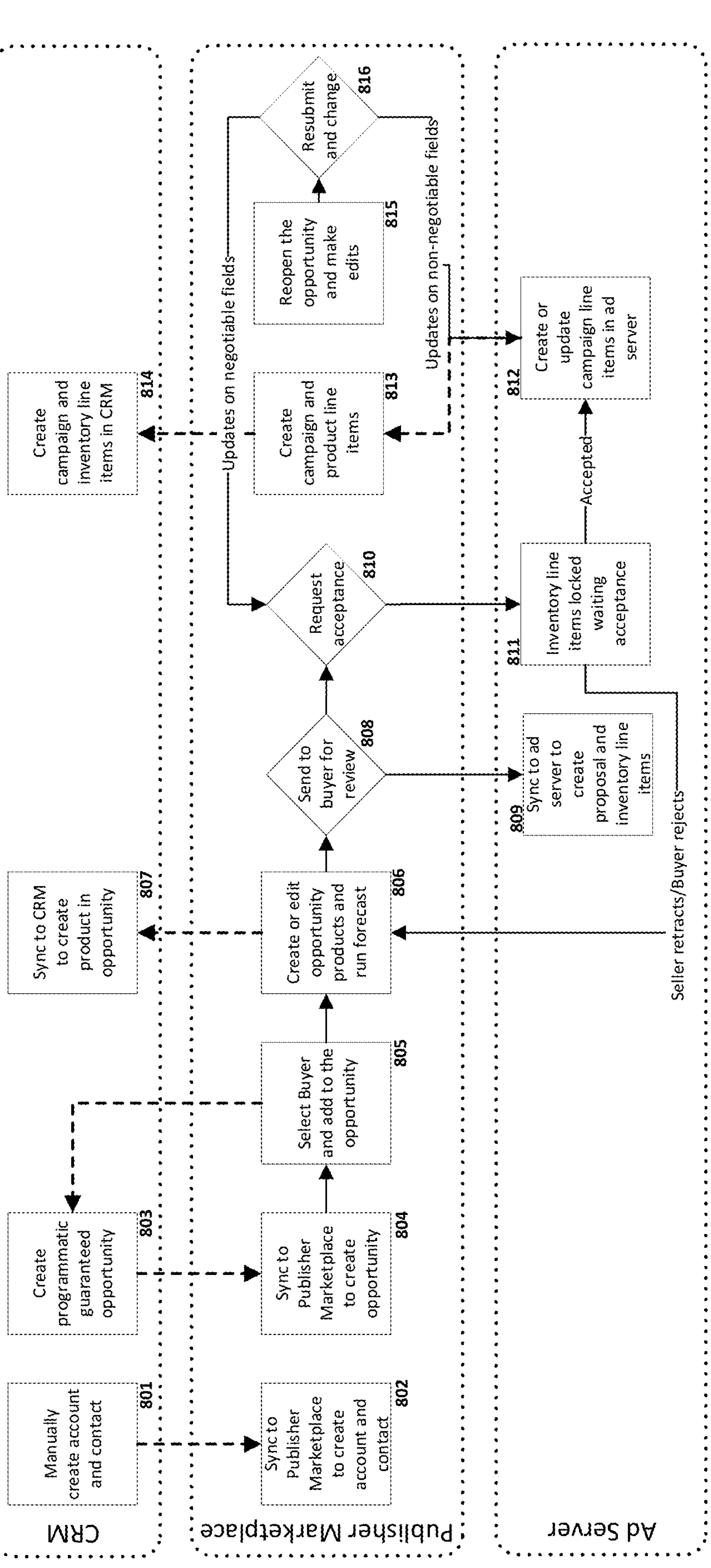
FIG. 8 is a diagram of data flow between different devices in an integrated programmatic digital placement system.

FIG. 8 is a diagram of data flow between different devices in an integrated programmatic digital placement system. Specifically, FIG. 8 illustrates an exemplary programmatic proposal process initiated by seller. In step 801, a sales representative of seller 201 may manually create an account and add contact information for a new customer buyer 210 into CRM of seller 201. In step 802, the creation of an account in CRM of seller 201 triggers an automatic data sync via an API to web application 203, where an account is created for buyer 210 on publisher marketplace dashboard of seller 201. In step 803, a sales representative of seller 201 may further begin a new negotiation and proposal process with buyer 210 by creating a proposal in the CRM of seller 201. A sale representative of seller 201 proposal created in a CRM may immediately trigger an automatic data sync via an API to web application 203, where a parallel proposal is created for buyer 210 on seller 201 publisher marketplace dashboard in step 804. In step 805, a seller 201 sales representative may then edit or add information to the proposal within the publisher marketplace, and continue negotiation and communication with buyer 210, where all changes to the proposal in the publisher marketplace are linked to the previously created proposal in CRM of seller 201 in step 803 and are periodically automatically updated via an API from web application 203. In step 806, sales representative of seller 201 may run a forecast based on a myriad of factors related to the requested ad inventory and the buyer 210 target audience within the publisher marketplace to facilitate negotiation. Sales representatives of seller 201 may edit line items representing potential allocation of inventory on the proposal within the publisher marketplace of web application 203 as negotiation with buyer 210 proceeds, triggering a parallel product be created on the proposal within an integrated CRM of seller 201 in step 807.

In step 808, seller 201 may then send the proposal to buyer 210 via the publisher marketplace for review. In step 809, seller sending the proposal to buyer triggers an API request to ad server 102 to reserve ad inventory related to the proposal in anticipation of buyer 210 agreement to the deal terms. In step 810, after buyer 210 has accepted preliminary deal terms, seller 201 may send a request for acceptance to the buyer to the final deal terms via the publisher marketplace to finalize the deal terms. In step 811, reserved inventory is locked into the ad server 102, pending acceptance of the buyer. A proposal may be rejected by buyer 210, allowing seller 201 to adjust the proposal within publisher marketplace in order to resend the proposal after further changes in step 806. Alternatively, buyer 210 may agree to a formal proposal of seller 201, automatically locking in the previously reserved inventory available on ad server 102 via API request for use by buyer 210. In step 812, inventory locked on the ad server 102 simultaneously creates or updates a campaign in the ad server 102. In step 813, the campaign updates to ad server 102 trigger an API request to the publisher marketplace assigning campaign line items representing ad inventory, and updating the proposal within the publisher marketplace. In step 814, the updated campaign and product line items within the publisher marketplace trigger and API request to create or update the campaign and inventory line items within CRM of seller 201. In step 815, the seller 201 may reopen the opportunity and make edits an agreed upon proposal. In step 816, the seller 201 may resubmit the reopened proposal with changes which may include negotiable and non-negotiable fields, triggering another request for acceptance to the buyer via the publisher marketplace. Non-negotiable fields automatically update the accepted campaign and products within the publisher marketplace. Negotiable fields require additional buyer acceptance for approval.

FIG. 9A is a diagram of an exemplary graphical user interface (GUI) display associated with a digital placement proposal. The GUI displays a proposal within the publisher marketplace of web application 203. A proposal created by seller 201 may initiate negotiation for available ad inventory with buyer 210 and may contain details in the GUI including but not limited to buyer organization name, proposal title, closing date, stage, probability, amount, quantity, sales representative, sales planner, and trafficker.

FIG. 9B is a diagram of an exemplary graphical user interface (GUI) display associated with a digital placement campaign. The GUI displays a campaign within a proposal within the publisher marketplace of web application 203. A campaign GUI may contain details relating to the associated proposal issued to buyer 210 including but not limited to campaign ID, sales representative, trafficker, sales planner, status, start and end date, ad server ID, total value booked and total value planned. A campaign GUI may also provide a URL link to the associated proposal web page, and a URL link to an integrated CRM web page where the campaign can be viewed.

FIG. 9C is a diagram of an exemplary graphical user interface (GUI) display associated with digital campaign inventory. The GUI displays line item details representing allocated ad inventory of a campaign within the publisher marketplace of web application 203. A GUI for ad inventory that is allocated as part of a campaign within a proposal between seller 201 and buyer 210 on the publisher marketplace may contain details related to the campaign the ad inventory is allocated for, and information describing the ad inventory used such as impressions to date, clicks to date, eCPM to date, CTR to date, targeting ID, geo targeting information, platform, and forecast information. The GUI displaying line item details of a campaign may contain a URL link to the associated campaign in the publisher marketplace, as well as a URL link to the associated campaign in a CRM of seller 201.

Figure 10A:
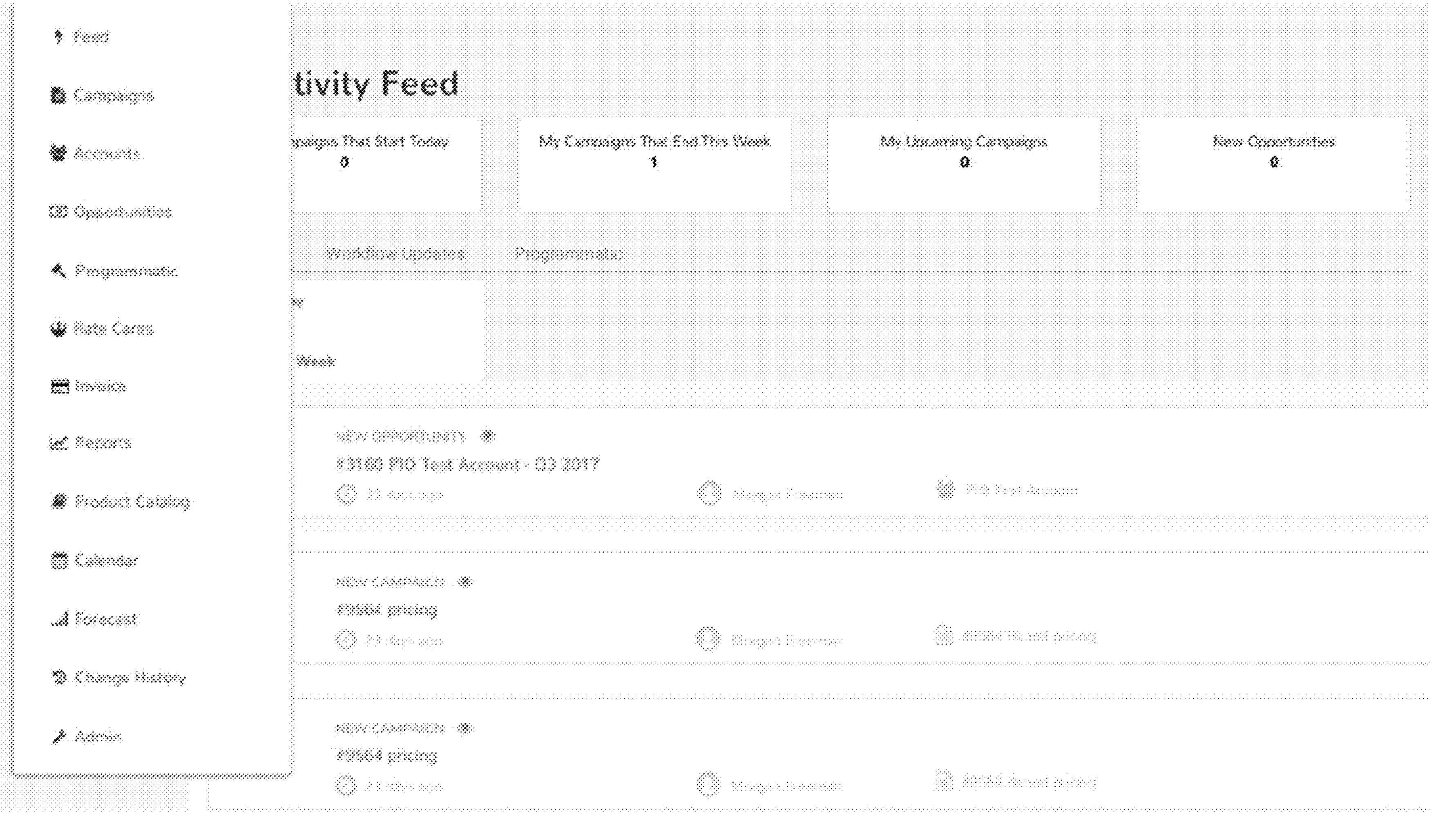

FIGS. 10A-E are screenshots illustrating alternative graphic user interface (GUI) displays associated with use of an integrated programmatic digital placement system. In the screenshot of FIG. 10A, the graphic user interface presents a variety of different options for programmatically managing digital placements. Such options may be categorized in association with campaigns, accounts, opportunities, programmatic placement, rate cards, invoices, reports, product catalogs, calendars, forecasts, change history, and admin tools.

Figures 10B, 10C:
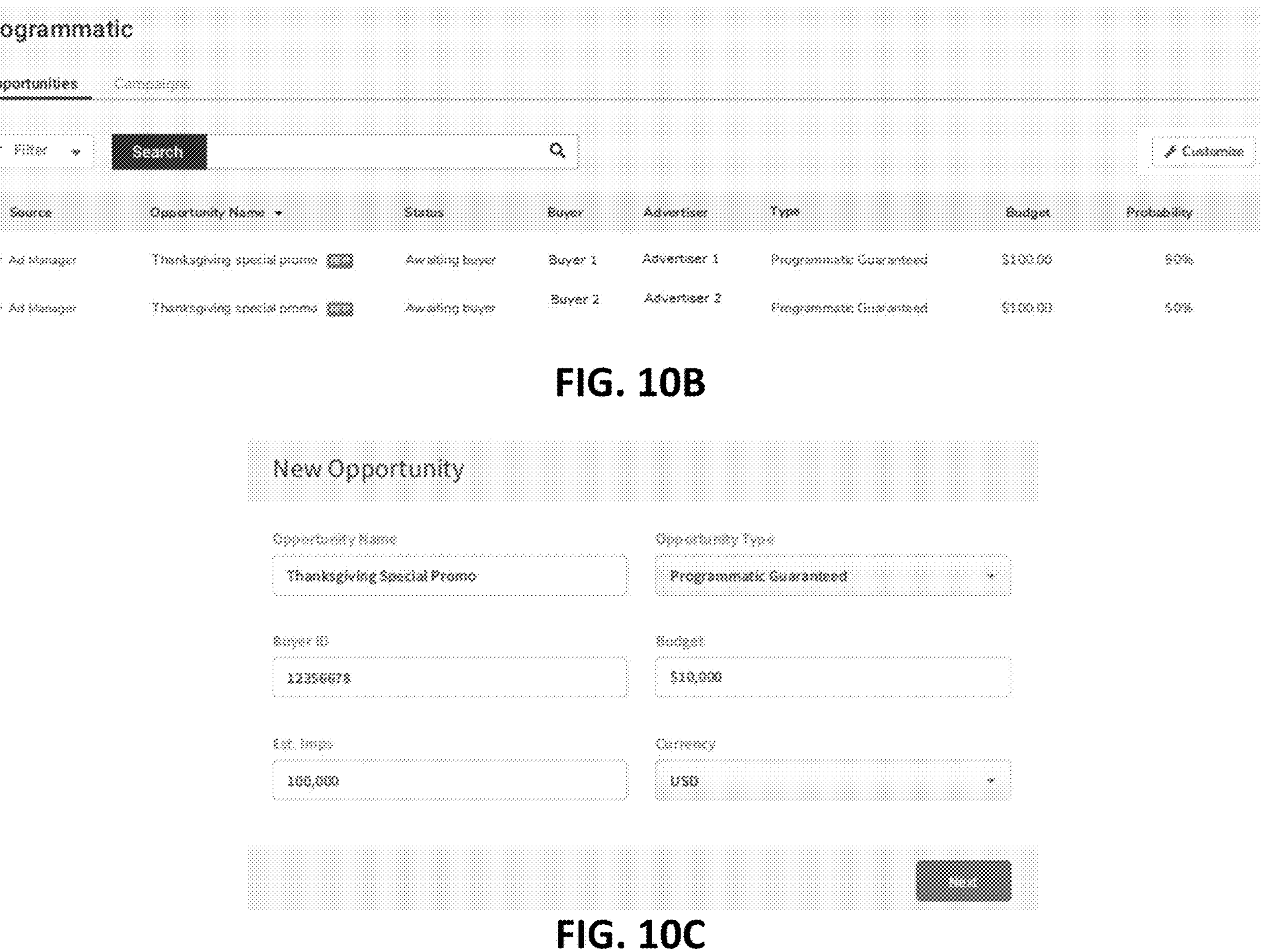

In the screenshot of FIG. 10B, the graphic user interface provides tracked data regarding programmatic opportunities and campaigns. Search options are also available that allow a user to search for and filter through programmatic placement deals (e.g., by seller) for specific types of opportunity and campaign objects. The screenshot of FIG. 10C illustrates an exemplary graphic user interface that may be used by a user to create placement opportunities. The parameters entered by the user may thereafter be used to initiate placement workflows and related functions.

The screenshot of FIG. 10D illustrates an exemplary graphic user interface in which a user can create a programmatic opportunity shell. For example, the user may fill in or otherwise populate the opportunity line items regarding such parameters as time frame, cost basis, units, cost, and total booked.

Figure 10E:
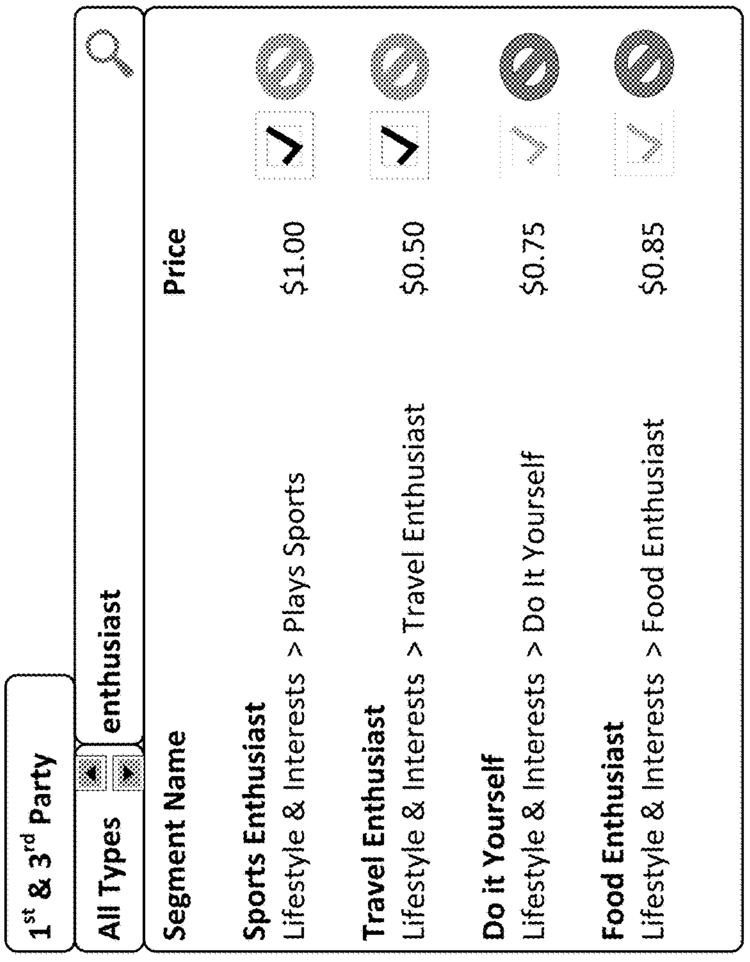

FIG. 10E is a screenshot of an exemplary graphic user interface that may be presented to a user interested in targeting to specific audiences. As illustrated, the different audiences may be categorized (e.g., by interest) into different segments that may or may not overlap. As illustrated in the example of FIG. 10E, the audiences may be categorized into overlapping interest groups. Other types of segmentation based on different factors may be possible based on information available (e.g., from first-party lists). In addition to providing for positive selection of segments of interest, the graphic user interface of FIG. 10E further allows for exclusion of certain segments as well. Thus, the graphic user interface of FIG. 10E allows the user to tailor their digital placement instructions to highly-targeted audiences.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method for automated workflows for publishing digital content campaigns, the method comprising:

storing one or more custom workflows in memory associated with each of a plurality of different third party server systems, each custom workflow corresponding to one or more rules;

automatically mapping one or more third-party accounts associated with a user device maintained at the different third party server systems, each third party system further maintaining third party data associated with the user device;

synchronizing in real time, data associated with each of the different third party server systems and a platform server in accordance with the mapped accounts via an application programming interface (API), wherein a change in third party data maintained at the different third party server systems triggers an automatic data sync to the platform server via the API, and a change in data in the platform server triggers automatic data sync to the third party server systems;

generating a graphic user interface for the user device, the graphic user interface presenting a real-time list of available digital content inventory based on the synchronized data, wherein the user device is associated with one of the accounts mapped to one of the server systems;

automating approval of a proposal associated with input by the user device via the graphic user interface, wherein automating approval of the proposal is based on the custom workflows associated with the mapped server system, wherein the approval triggers an automatic data sync from the platform server to the different third party server systems; and publishing one or more digital content from the list to a web page based on the automated approval.

2. The method of claim 1, wherein the proposal is one of a plurality of proposals associated with the mapped server system.

3. The method of claim 1, wherein the published digital content are associated with a campaign, and wherein the mapped server system is associated with a plurality of different campaigns.

4. The method of claim 1, wherein automating approval further includes automating creation of one or more orders in accordance with the custom workflows associated with the mapped server system.

5. The method of claim 4, further comprising syncing the orders to the platform server associated with the available digital content inventory.

6. The method of claim 1, further comprising syncing the automated approval between the mapped server system and the platform server.

7. The method of claim 1, further comprising sending the proposal to the plurality of different server systems.

8. The method of claim 6, further comprising dynamically applying the rules to the available digital content inventory in real-time, and generating the real-time list of available digital content inventory based on the dynamically applied rules.

9. The method of claim 1, wherein the graphic user interface further includes metrics associated with the real-time list of available digital content inventory.

10. The method of claim 9, wherein the available digital content inventory presented within the graphic user interface are associated with different server systems.

11. A system for automated workflows for publishing digital content campaigns, the system comprising:

memory that stores one or more custom workflows associated with each of a plurality of different server systems, each custom workflow corresponding to one or more rules;

a processor that executes instructions stored in memory, wherein the processor executes the instructions to:

automatically map one or more third-party accounts associated with a user device maintained at the different server systems, each third party system further maintaining third party data associated with the user device;

synchronize in real time, data associated with each of the different third party server systems and a platform server in accordance with the mapped accounts via an application programming interface (API), wherein a change in third party data maintained at the different third party server systems triggers an automatic data sync to the platform server via the API, and a change in data in the platform server triggers automatic data sync to the third party server systems;

generate a graphic user interface for a user device, the graphic user interface presenting a real-time list of available digital content inventory based on the synchronized data, wherein the user device is associated with one of the accounts mapped to one of the server systems; and automate approval of a proposal associated with input by the user device via the graphic user interface, wherein automating approval of the proposal is based on the custom workflows associated with the mapped server system, wherein the approval triggers an automatic data sync from the platform server to the different third party server systems; and a communication interface that communicates over a communication network to publish one or more digital content from the list to a web page based on the automated approval.

12. The system of claim 11, wherein the proposal is one of a plurality of proposals associated with the mapped server system.

13. The system of claim 11, wherein the published digital content are associated with a campaign, and wherein the mapped server system is associated with a plurality of different campaigns.

14. The system of claim 11, wherein the processor automates approval by further automating creation of one or more orders in accordance with the custom workflows associated with the mapped server system.

15. The system of claim 14, wherein the communication interface further syncs the orders to the platform server associated with the available digital content inventory.

16. The system of claim 11, wherein the communication interface further syncs the automated approval between the mapped server system and the platform server.

17. The system of claim 11, wherein the communication interface further sends the proposal to the plurality of different server systems.

18. The system of claim 16, wherein the processor executes further instructions to dynamically apply the rules to the available digital content inventory in real-time, and to generate the real-time list of available digital content inventory based on the dynamically applied rules.

19. The system of claim 11, wherein the graphic user interface further includes metrics associated with the real-time list of available digital content inventory.

20. The system of claim 19, wherein the available digital content inventory presented within the graphic user interface are associated with different server systems.

21. A non-transitory, computer-readable storage medium, having embodied thereon a program executable by a processor to perform a method for automated workflows for publishing digital content campaigns, the method comprising:

storing one or more custom workflows in memory associated with each of a plurality of different third party server systems, each custom workflow corresponding to one or more rules;

automatically mapping one or more third-party accounts associated with a user device maintained at the different third party server systems, each third party system further maintaining third party data associated with the user device;

synchronizing in real time, data associated with each of the different third party server systems and a platform server in accordance with the mapped accounts via an application programming interface (API), wherein a change in third party data maintained at the different third party server systems triggers an automatic data sync to the platform server via the API, and a change in data in the platform server triggers automatic data sync to the third party server systems;

generating a graphic user interface for the user device, the graphic user interface presenting a real-time list of available digital content inventory based on the synchronized data, wherein the user device is associated with one of the accounts mapped to one of the server systems;

automating approval of a proposal associated with input by the user device via the graphic user interface, wherein automating approval of the proposal is based on the custom workflows associated with the mapped server system, wherein the approval triggers an automatic data sync from the platform server to the different third party server systems; and publishing one or more digital content from the list to a web page based on the automated approval.

* * * * *